(12) United States Patent
Takemasa et al.

(10) Patent No.: US 7,282,877 B2
(45) Date of Patent: Oct. 16, 2007

(54) DC BRUSH MOTOR ROTATION AMOUNT DETECTION METHOD AND APPARATUS

(75) Inventors: Noriyuki Takemasa, Fujieda (JP); Ayako Yamada, Fujieda (JP); Hiromi Iwasaki, Fujieda (JP); Norihiro Suzuki, Fujieda (JP)

(73) Assignee: Murakami Corporation, Shizuoka (JP)

( * ) Notice: Subject to any disclaimer, the term of this patent is extended or adjusted under 35 U.S.C. 154(b) by 149 days.

(21) Appl. No.: 11/281,187

(22) Filed: Nov. 16, 2005

(65) Prior Publication Data

US 2006/0208722 A1    Sep. 21, 2006

(30) Foreign Application Priority Data

Feb. 25, 2005   (JP) .............................. 2005-052136

(51) Int. Cl.
*H02K 21/00*   (2006.01)
(52) U.S. Cl. ...................... 318/254; 318/138; 318/439; 318/807
(58) Field of Classification Search ................ 318/254, 318/138, 439, 807, 811; 388/800, 811, 819, 388/912
See application file for complete search history.

(56) References Cited

U.S. PATENT DOCUMENTS

2005/0099153 A1*   5/2005   Komatsu et al. ............ 318/807

* cited by examiner

*Primary Examiner*—Karen Masih
(74) *Attorney, Agent, or Firm*—Hedman & Costigan P.C.; James V. Costigan

(57) ABSTRACT

The present invention provides a DC brush motor rotation amount detection method comprising the steps of: counting pulses generated by switching of brushes when a DC brush motor rotates; removing any noise pulse generated during a pulse rejection period which is shorter than a pulse interval and which is started when each pulse is generated; counting pulses generated during pulse acceptance periods outside the pulse rejection periods; and detecting a rotation amount of the DC brush motor, wherein the pulse rejection period during steady-state operation of the DC brush motor is ended when a predetermined time elapses from a start point of the pulse rejection period, where the predetermined time is calculated by multiplying a pulse interval of a corresponding pulse zone one rotation before a pulse zone to which the pulse rejection period belongs by a coefficient $K(\frac{1}{2} < K < 1)$.

12 Claims, 13 Drawing Sheets

DC BRUSH MOTOR ROTATION AMOUNT DETECTION METHOD AND APPARATUS

The disclosure of Japanese Patent Application No. JP2005-52136 filed on Feb. 25, 2005 including the specification, drawing and abstract is incorporated herein by reference in its entirety.

BACKGROUND OF THE INVENTION

1. Field of the Invention

The present invention relates to a reverse-shift-activated mirror angle control method and apparatus which allow a driver to visually check areas around rear wheels during backing-up (e.g., when backing into a parking space) by turning mirror surfaces of vehicle outer mirrors downward by predetermined amounts simultaneously as gear-shifting means of a vehicle is set to a reverse position and restore the original mirror angles by moving, the mirrors upward by predetermined amounts simultaneously as the gear-shifting means is subsequently switched to another operating position from the reverse position, reducing deviations in a return position caused by repetition of turning operation. Also, it relates to a method and apparatus for detecting a rotation amount of the DC brush motor by counting pulses generated by switching of brushes when a DC brush motor rotates to improve detection accuracy of the rotation amount of the motor during steady-state operation.

However, present claims of this application define the invention of "DC BRUSH MOTOR ROTATION AMOUNT DETECTION METHOD AND APPARATUS". The invention of "REVERSE-SHIFT-ACTIVATED MIRROR ANGLE CONTROL METHOD AND APPARATUS FOR VEHICLE OUTER MIRROR" corresponds to an invention which utilizes the invention of "DC BRUSH MOTOR ROTATION AMOUNT DETECTION METHOD AND APPARATUS". The applicants have not abandoned the right to obtain (a) patent(s) about the invention of "REVERSE-SHIFT-ACTIVATED MIRROR ANGLE CONTROL METHOD AND APPARATUS FOR VEHICLE OUTER MIRROR".

2. Description of the Related Art

Regarding vehicle outer mirrors equipped with a motor-operated mirror angle adjustment mechanism, it has been proposed to add a reverse-shift-activated mirror angle control function (such as the one described above) to them using the motor-operated mirror angle adjustment mechanism and such a function has been put into actual use. To implement the reverse-shift-activated mirror angle control function, it is necessary to detect the turning amount of a mirror surface in order to stop the mirror surface at a predetermined mirror angular position during downward motion and return the mirror surface to the original mirror angular position during upward (return) motion. Thus, as a method for detecting the turning amount of a mirror surface in a simple manner, a method which detects the turning amount of the mirror surface by counting pulses generated by switching of brushes when a DC brush motor, i.e., a power source of the motor-operated mirror angle adjustment mechanism, rotates has been proposed and put into actual use. With this method, however, depending on the type of motor, the temperature around the motor, secular changes, etc., there can be a situation in which noise pulses are detected other than at switching positions of the brushes or pulses are not detected (missing pulses) at switching positions, causing deviations between actual turning amount and pulse count. Consequently, the return position can deviate gradually as downward and return motions are repeated, making it necessary to manually correct the mirror angular position from time to time.

To solve the above problems, techniques described in patent documents 1 and 2 have been proposed. The technique described in patent document 1 involves removing noise pulses using a hardware-based high pass filter and low pass filter. The technique described in patent document 2 involves calculating the average of pulse signal intervals, and then ignoring (not counting) the current pulse by determining it to be a noise pulse if the signal interval between the current pulse and previous pulse is not more than 75% of the average, or counting an extra pulse by determining it to be a missing pulse if the signal interval between the current pulse and previous pulse is not less than 150% of the average.

[Patent document 1] Japanese Patent Laid-Open No. 2004-182126

[Patent document 2] Japanese Patent No. 3547523

The technique described in patent document 1 cannot discriminate a noise pulse from a normal pulse generated by switching of brushes if the pulses are close in frequency band, and thus cannot remove the noise pulse. Also, since the high pass filter and low pass filter are hardware-based, the addition of the hardware will increase costs. With the technique described in patent document 2, since any missing signal can affect (increase) the calculated average, normal pulses generated by switching of the brushes are sometimes removed by being determined to be noise pulses (resulting in missing pulses).

SUMMARY OF THE INVENTION

The present invention has been made in view of the above circumstances and has an object to provide a reverse-shift-activated mirror angle control method and apparatus for a vehicle outer mirror which method and apparatus can prevent miscounting of pulses generated by switching of brushes and reduce deviations in return position caused by repetition of turning operation. Also, the present invention has an object to provide a rotation amount detection method and apparatus which can improve accuracy of detecting a rotation amount of a DC brush motor running in steady state operation, where the rotation amount is detected by counting pulses generated by switching of the brushes when the DC brush motor rotates.

A reverse-shift-activated mirror angle control method according to the present invention is an improvement to a method which allows a driver to visually check areas around rear wheels during backing-up by turning a mirror surface downward by a predetermined amount simultaneously as gear-shifting means of a vehicle is set to a reverse position by means of a motor-operated mirror angle adjustment mechanism for adjusting a mirror angle of a vehicle outer mirror in an up-and-down direction using a DC brush motor as a power source and restores the original mirror angle by moving the mirror surface upward by a predetermined amount simultaneously as the gear-shifting means is subsequently switched to another operating position from the reverse position, the method comprising the steps of: counting pulses generated by switching of brushes when the DC brush motor rotates; controlling a turning amount of the mirror surface in accordance with the pulse count; removing (masking) any noise pulse generated during a pulse rejection period which is shorter than a pulse interval and which is started when the pulse is generated; and counting pulses generated during pulse acceptance periods outside the pulse rejection periods.

When setting a pulse rejection period, it is important how to set its end time (start time of a pulse acceptance period). That is, if the end time of the pulse rejection period is too early, there is a high possibility that a noise pulse will be picked up. Conversely, if the end time of the pulse rejection period is too late, there is a high possibility that a normal pulse will be removed. Thus, to prevent miscounting, it is important to accurately predict the time when a next pulse will be generated by switching of brushes and to end the pulse rejection period just before this time as much as possible.

The number of pulses generated by switching of brushes when the DC brush motor rotates is six pet rotation in the case of a three-pole brush motor, for example. In this case, even if time intervals (pulse intervals) between adjacent pulses during steady-state operation are uniform in design terms, there are variations due to assembly error of the motor and the like. If the end times of the pulse rejection periods during steady-state operation are set to a fixed time from the previous pulse or set based on the average of past pulse intervals, it is not possible to sufficiently prevent miscounting due to noise pulses or missing pulses.

Thus, in the reverse-shift-activated mirror angle control method according to the present invention, the pulse rejection period during steady-state operation of the DC brush motor is ended when a predetermined time elapses from a start point of the pulse rejection period, where the predetermined time is calculated by multiplying a pulse interval of a corresponding pulse zone one rotation before a pulse zone to which the pulse rejection period belongs by a coefficient $K(½<K<1)$. That is, according to this method, even if there are variations in pulse intervals between adjacent pulses during steady-state operation due to assembly errors of the motor and the like, the variations do not have effect because the end time of each pulse rejection period is set based on the pulse interval at the corresponding position (the same rotational position) in the previous rotation. Thus, this method can reduce miscounting due to noise pulses or missing pulses and consequently reduce deviations in return position caused by repetition of turning operation. Besides, unlike the technique described in patent document 1, since there is no need to use a hardware-based high pass filter or low pass filter, this method can avoid cost increases due to addition of hardware.

Also, in the reverse-shift-activated mirror angle control method according to the present invention, the pulse rejection period during steady-state operation of the DC brush motor is ended when a predetermined time elapses from an end point of a pulse rejection period in a pulse zone immediately preceding a pulse zone to which the current pulse rejection period belongs, where the predetermined time is calculated as the sum of a time obtained by multiplying a pulse interval of a corresponding pulse zone one rotation before the immediately preceding pulse zone by a coefficient $1-K$ ($½<K<1$) and a time obtained by multiplying a pulse interval of a corresponding pulse zone one rotation before a pulse zone to which the current pulse rejection period belongs by a coefficient K.

Furthermore, in the reverse-shift-activated mirror angle control method according to the present invention, by comparing a pulse interval of a pulse zone immediately preceding a pulse zone to which the current pulse rejection period belongs with a pulse interval of a corresponding pulse zone one rotation before the immediately preceding pulse zone during steady-state operation of the DC brush motor, if the pulse interval of the immediately preceding pulse zone is shorter than the pulse interval of a corresponding pulse zone one rotation before the immediately preceding pulse zone, the current pulse rejection period is ended when a predetermined time elapses from a start point of the current pulse rejection period, where the predetermined time is calculated by multiplying a pulse interval of a corresponding pulse zone one rotation before a pulse zone to which the current pulse rejection period belongs by a coefficient $K(½<K<1)$, and if the pulse interval of the immediately preceding pulse zone is equal to or longer than the pulse interval of the corresponding pulse zone one rotation before the immediately preceding pulse zone, the current pulse rejection period is ended when a predetermined time elapses from an end point of a pulse rejection period in a pulse zone immediately preceding a pulse zone to which the current pulse rejection period belongs, where the predetermined time is calculated as the sum of a time obtained by multiplying a pulse interval of a corresponding pulse zone one rotation before the immediately preceding pulse zone by a coefficient $1-K$ ($½<K<1$) and a time obtained by multiplying a pulse interval of a corresponding pulse zone one rotation before a pulse zone to which the current pulse rejection period belongs by a coefficient K.

Incidentally, in the reverse-shift-activated mirror angle control method according to the present invention, a minimum value can be set for "the time obtained by multiplying the pulse interval of the corresponding pulse zone one rotation before the pulse zone to which the pulse rejection period belongs by the coefficient K."

Also, in the reverse-shift-activated mirror angle control method according to the present invention, the pulse count can be forcibly incremented by one if a next pulse is not generated from the end point of a pulse rejection period to a predetermined time point in a pulse zone next to the pulse zone to which the pulse rejection period belongs. This makes it possible to prevent miscounting due to missing pulses. In this case, the predetermined time point may be, for example, a time point when a predetermined time elapses from the end point of the pulse rejection period, where the predetermined time is calculated as the sum of a time obtained by multiplying the pulse interval of a corresponding pulse zone one rotation before the pulse zone to which the pulse rejection period belongs by the coefficient $1-K$ and a time obtained by multiplying the pulse interval of the pulse zone next to the corresponding pulse zone one rotation before by the coefficient K. Besides, if a pulse interval is not measured in a pulse zone because no pulse is generated until the predetermined time point, for example, the last pulse intervals measured at corresponding pulse zones in a rotation preceding the pulse zone in which no pulse is generated may be used as pulse interval values which define end points of pulse rejection periods in corresponding pulse zones one rotation after two pulse zones before and after the pulse zone.

The present invention provides a reverse-shift-activated mirror angle control apparatus which allows a driver to visually check areas around rear wheels during backing-up by turning a mirror surface downward by a predetermined amount simultaneously as gear-shifting means of a vehicle is set to a reverse position by means of a motor-operated mirror angle adjustment mechanism for adjusting a mirror angle of a vehicle outer mirror in an up-and-down direction using a DC brush motor as a power source and restores the original mirror angle by moving the mirror surface upward by a predetermined amount simultaneously as the gear-shifting means is subsequently switched to another operating position from the reverse position, the reverse-shift-activated mirror angle control apparatus comprising: pulse detecting means which detects pulses generated by switching of brushes when the DC brush motor rotates; pulse rejection period setting means which sets a pulse rejection period in which acceptance of a next pulse is rejected for a predetermined period shorter than a pulse generation interval when the pulse detecting means detects a pulse; a counter which counts pulses generated during pulse acceptance periods outside the pulse rejection periods; motor control means which controls a turning amount of the mirror surface by running the DC brush motor in accordance with pulse count of the counter; pulse interval measuring means which measures time intervals between pulses generated in the pulse acceptance periods; and a pulse interval memory which stores the time intervals between pulses measured by the pulse interval measuring means, wherein the pulse rejection period setting means ends the pulse rejection period during steady-state operation of the DC brush motor when a predetermined time elapses from a start point of the pulse rejection period, where the predetermined time is calculated by multiplying a pulse interval of a corresponding pulse zone one rotation before a pulse zone to which the pulse rejection period belongs by a coefficient $K(½<K<1)$, where the pulse interval is stored in the pulse interval memory.

In the reverse-shift-activated mirror angle control apparatus according to the present invention, the pulse rejection period setting means ends the pulse rejection period during steady-state operation of the DC brush motor when a predetermined time elapses from an end point of a pulse rejection period in a pulse zone immediately preceding a pulse zone to which the current pulse rejection period belongs, where the predetermined time is calculated as the sum of a time obtained by multiplying a pulse interval of a corresponding pulse zone one rotation before the immediately preceding pulse zone by a coefficient $1-K(½<K<1)$, where the pulse interval is stored in the pulse interval memory, and a time obtained by multiplying a pulse interval of a corresponding pulse zone one rotation before a pulse zone to which the current pulse rejection period belongs by a coefficient K, where the pulse interval is stored in the pulse interval memory.

The reverse-shift-activated mirror angle control apparatus according to the present invention further comprises comparing means which compares a pulse interval of a pulse zone immediately preceding a pulse zone to which the current pulse rejection period belongs with a pulse interval of a corresponding pulse zone one rotation before the immediately preceding pulse zone, wherein during steady-state operation of the DC brush motor, if the pulse interval of the immediately preceding pulse zone is shorter than the pulse interval of a corresponding pulse zone one rotation before the immediately preceding pulse zone, the pulse rejection period setting means ends the current pulse rejection period when a predetermined time elapses from a start point of the current pulse rejection period, where the predetermined time is calculated by multiplying a pulse interval of a corresponding pulse zone one rotation before a pulse zone to which the current pulse rejection period belongs by a coefficient $K(½<K<1)$, and if the pulse interval of the immediately preceding pulse zone is equal to or longer than the pulse interval of the corresponding pulse zone one rotation before the immediately preceding pulse zone, the pulse rejection period setting means ends the current pulse rejection period when a predetermined time elapses from an end point of a pulse rejection period in an immediately preceding pulse zone, where the predetermined time is calculated as the sum of a time obtained by multiplying a pulse interval of a corresponding pulse zone one rotation before the immediately preceding pulse zone by a coefficient $1-K(½<K<1)$ and a time obtained by multiplying a pulse interval of a corresponding pulse zone one rotation before a pulse zone to which the current pulse rejection period belongs by a coefficient K.

The reverse-shift-activated mirror angle control apparatus according to the present invention may further comprise a mode switching means which switches pulse rejection period settings of the pulse rejection period setting means so as to set a fixed-length pulse rejection period started by a pulse generated after the gear-shifting means is set to the reverse position and power supply to the DC brush motor is started to turn the mirror surface downward and count pulses generated during the pulse acceptance periods outside the pulse rejection periods, with the counter; switch to a control mode for the steady-state operation and continue to count pulses if a condition in which a pulse is generated within a predetermined time span in the pulse acceptance period occurs at a predetermined number of times consecutively; and stop the power supply to the DC brush motor when the pulse count reaches the sum of the reference pulse count and a pulse count produced by-coasting after the mirror surface is turned upward at the previous time, set a fixed-length pulse rejection period, and further count the pulses generated during the pulse acceptance periods outside the pulse rejection periods from among pulses attributable to counter-electromotive force generated by the coasting of the DC brush motor; thereby counting all the pulses generated in the pulse acceptance periods from the time when the DC brush motor starts in the downward direction until the DC brush motor stops; and subsequently set a fixed-length pulse rejection period started by a pulse generated after the gear-shifting means is subsequently switched to another operating position from the reverse position and power supply to the DC brush motor is started to turn the mirror surface upward and count pulses generated during the pulse acceptance periods outside the pulse rejection periods; switch to a control mode for the steady-state operation and continue to count pulses if a condition in which a pulse is generated within a predetermined time span in the pulse acceptance period occurs at a predetermined number of times consecutively; and stop the power supply to the DC brush motor when the pulse count reaches the sum of the predetermined reference pulse count and a pulse count produced by coasting after the mirror surface is turned downward at the previous time, set a fixed-length pulse rejection period, and further count the pulses generated during the pulse acceptance periods outside the pulse rejection periods from among pulses attributable to counter-electromotive force generated by the coasting of the DC brush motor; thereby counting all the pulses generated in pulse acceptance periods from the time when the DC brush motor starts in the upward direction until the DC brush motor stops.

Also, in the reverse-shift-activated mirror angle control apparatus according to the present invention, the pulse rejection period setting means may forcibly increment the pulse count by one if a next pulse is not generated from the end point of a pulse rejection period to a predetermined time point in a pulse zone next to the pulse zone to which the pulse rejection period belongs.

The present invention provides a DC brush motor rotation amount detection method comprising the steps of: counting pulses generated by switching of brushes when a DC brush motor rotates; removing any noise pulse generated during a pulse rejection period which is shorter than a pulse interval and which is started when each pulse is generated; counting pulses generated during pulse acceptance periods outside the pulse rejection periods; and detecting a rotation amount of the DC brush motor, wherein the pulse rejection period during steady-state operation of the DC brush motor is ended when a predetermined time elapses from a start point of the pulse rejection period, where the predetermined time is calculated by multiplying a pulse interval of a corresponding pulse zone one rotation before a pulse zone to which the pulse rejection period belongs by a coefficient $K(\frac{1}{2}<K<1)$.

With the DC brush motor rotation amount detection method according to the present invention, even if there are variations in pulse intervals between adjacent pulses during steady-state operation due to assembly errors of the motor and the like, variations do not have effect because the end time of each pulse rejection period is set based on the pulse interval at the corresponding position (the same rotational position) in the previous rotation. Thus, this method can reduce miscounting due to noise pulses or missing pulses and consequently improve accuracy of detecting a rotation amount of a DC brush motor running in steady state operation.

Also, in the DC brush motor rotation amount detection method according to the present invention, the pulse rejection period during steady-state operation of the DC brush motor is ended when a predetermined time elapses from an end point of a pulse rejection period in a pulse zone immediately preceding a pulse zone to which the current pulse rejection period belongs, where the predetermined time is calculated as the sum of a time obtained by multiplying a pulse interval of a corresponding pulse zone one rotation before the immediately preceding pulse zone by a coefficient $1-K(\frac{1}{2}<K<1)$ and a time obtained by multiplying a pulse interval of a corresponding pulse zone one rotation before a pulse zone to which the current pulse rejection period belongs by a coefficient K.

Furthermore, in the DC brush motor rotation amount detection method according to the present invention, by comparing a pulse interval of a pulse zone immediately preceding a pulse zone to which the current pulse rejection period belongs with a pulse interval of a corresponding pulse zone one rotation before the immediately preceding pulse zone during steady-state operation of the DC brush motor, if the pulse interval of the immediately preceding pulse zone is shorter than the pulse interval of a corresponding pulse zone one rotation before the immediately preceding pulse zone, the current pulse rejection period is ended when a predetermined time elapses from a start point of the current pulse rejection period, where the predetermined time is calculated by multiplying a pulse interval of a corresponding pulse zone one rotation before a pulse zone to which the current pulse rejection period belongs by a coefficient $K(\frac{1}{2}<K<1)$, and if the pulse interval of the immediately preceding pulse zone is equal to or longer than the pulse interval of the corresponding pulse zone one rotation before the immediately preceding pulse zone, the current pulse rejection period is ended when a predetermined time elapses from an end point of a pulse rejection period in an immediately preceding pulse zone, where the predetermined time is calculated as the sum of a time obtained by multiplying a pulse interval of a corresponding pulse zone one rotation before the immediately preceding pulse zone by a coefficient $1-K(\frac{1}{2}<K<1)$ and a time obtained by multiplying a pulse interval of a corresponding pulse zone one rotation before a pulse zone to which the current pulse rejection period belongs by a coefficient K.

Incidentally, in the DC brush motor rotation amount detection method according to the present invention, a minimum value can be set for "the time obtained by multiplying the pulse interval of the corresponding pulse zone one rotation before the pulse zone to which the pulse rejection period belongs by the coefficient K."

Also, in the DC brush motor rotation amount detection method according to the present invention, the pulse count can be forcibly incremented by one if a next pulse is not generated from the end point of a pulse rejection period to a predetermined time point in a pulse zone next to the pulse zone to which the pulse rejection period belongs. This makes it possible to prevent miscounting due to missing pulses. In this case, the predetermined time point may be, for example, a time point when a predetermined time elapses from the end point of the pulse rejection period, where the predetermined time is calculated as the sum of a time obtained by multiplying the pulse interval of a corresponding pulse zone one rotation before the pulse zone to which the pulse rejection period belongs by the coefficient $1-K$ and a time obtained by multiplying the pulse interval of the pulse zone next to the corresponding pulse zone one rotation before by the coefficient K. Besides, if a pulse interval is not measured in a pulse zone because no pulse is generated until the predetermined time point, for example, the last pulse intervals measured at corresponding pulse zones in a rotation preceding the pulse zone in which no pulse is generated may be used as pulse interval values which define end points of pulse rejection periods in corresponding pulse zones one rotation after two pulse zones before and after the pulse zone.

The present invention provides a DC brush motor rotation amount detection apparatus comprising: pulse detecting means which detects pulses generated by switching of brushes when a DC brush motor rotates; pulse rejection period setting means which sets a pulse rejection period in which acceptance of a next pulse is rejected for a predetermined period shorter than a pulse generation interval when the pulse detecting means detects a pulse; a counter which counts pulses generated during pulse acceptance periods outside the pulse rejection periods and thereby detects a rotation amount of the DC brush motor, pulse interval measuring means which measures time intervals between pulses generated in the pulse acceptance periods; and a pulse interval memory which stores the time intervals between pulses measured by the pulse interval measuring means, wherein the pulse rejection period setting means ends the pulse rejection period during steady-state operation of the DC brush motor when a predetermined time elapses from a start point of the pulse rejection period, where the predetermined time, is calculated by multiplying a pulse interval of a corresponding pulse zone one rotation before a pulse zone to which the pulse rejection period belongs by a coefficient $K(\frac{1}{2}<K<1)$, where the pulse interval is stored in the pulse interval memory.

In the DC brush motor rotation amount detection apparatus according to the present invention, the pulse rejection period setting means ends the pulse rejection period during steady-state operation of the DC brush motor when a predetermined time elapses from an end point of a pulse rejection period in a pulse zone immediately preceding a pulse zone to which the current pulse rejection period belongs, where the predetermined time is calculated as the sum of a time obtained by multiplying a pulse interval of a corresponding pulse zone one rotation before the immediately preceding pulse zone by a coefficient $1-K(\frac{1}{2}<K<1)$, where the pulse interval is stored in the pulse interval memory, and a time obtained by multiplying a pulse interval of a corresponding pulse zone one rotation before a pulse zone to which the current pulse rejection period belongs by a coefficient K, where the pulse interval is stored in the pulse interval memory.

The DC brush motor rotation amount detection apparatus according to the present invention further comprises comparing means which compares a pulse interval of a pulse zone immediately preceding a pulse zone to which the current pulse rejection period belongs with a pulse interval of a corresponding pulse zone one rotation before the immediately preceding pulse zone, wherein during steady-state operation of the DC brush motor, if the pulse interval of the immediately preceding pulse zone is shorter than the pulse interval of a corresponding pulse zone one rotation before the immediately preceding pulse zone, the pulse rejection period setting means ends the current pulse rejection period when a predetermined time elapses from a start point of the current pulse rejection period, where the predetermined time is calculated by multiplying a pulse interval of a corresponding pulse zone one rotation before a pulse zone to which the current pulse rejection period belongs by a coefficient $K(\frac{1}{2}<K<1)$, and if the pulse interval of the immediately preceding pulse zone is equal to or longer than the pulse interval of the corresponding pulse zone one rotation before the immediately preceding pulse zone, the pulse rejection period setting means ends the current pulse rejection period when a predetermined time elapses from an end point of a pulse rejection period in an immediately preceding pulse zone, where the predetermined time is calculated as the sum of a time obtained by multiplying a pulse interval of a corresponding pulse zone one rotation before the immediately preceding pulse zone by a coefficient $1-K(\frac{1}{2}<K<1)$ and a time obtained by multiplying a pulse interval of a corresponding pulse zone one rotation before a pulse zone to which the current pulse rejection period belongs by a coefficient K.

Also, in the DC brush motor rotation amount detection apparatus according to the present invention, the pulse rejection period setting means may forcibly increment the pulse count by one if a next pulse is not generated from the end point of a pulse rejection period to a predetermined time point in a pulse zone next to the pulse zone to which the pulse rejection period belongs.

DETAILED DESCRIPTION OF THE PREFERRED EMBODIMENTS

Figure 2:
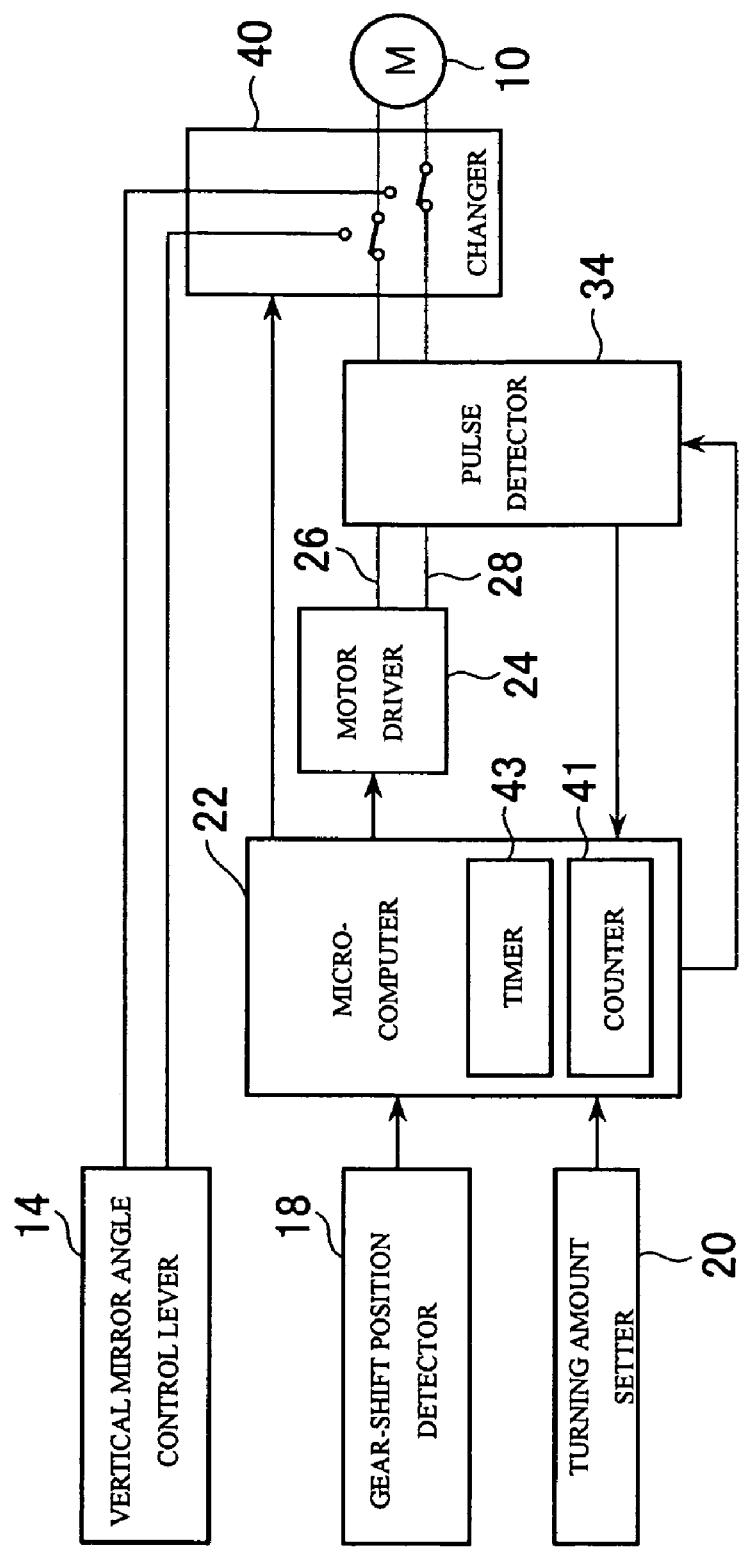
FIG. 2 is a block diagram showing a system configuration of a mirror angle control apparatus for a vehicle outer mirror according to an embodiment of the present invention.

Description will be given below of embodiments of a reverse-shift-activated mirror angle control method and apparatus for a vehicle outer mirror according to the present invention which use a DC brush motor rotation amount detection method and apparatus according to the present invention. FIG. 2 shows a system configuration of a vertical mirror angle control apparatus for a vehicle outer mirror (a horizontal mirror angle control apparatus is omitted). Vehicle outer mirrors such as door mirrors and fender mirrors contain a motor-operated mirror angle adjustment mechanism (not shown) for adjusting their mirror angles in the up-and-down direction. As a power source, the motor-operated mirror angle adjustment mechanism is equipped with an up/down drive motor 10 to turn the mirror surface in the up-and-down direction. The motor 10 is a DC brush motor. A vertical mirror angle control lever 14 is disposed near the driver's seat to adjust the vertical angle of the mirror surface by running the up/down drive motor 10. A gear-shift lever (gear-shifting means) is equipped with a gear-shift position detector 18 to detect its operating position (gear-shift position). On a turning amount setter 20, a turning amount is preset at the factory or set by the user of the vehicle to turn the mirror surface downward by that amount by running the up/down drive motor 10 when the gear-shift lever is set to a reverse position.

A changer 40 changes the way the motor 10 is controlled between vertical mirror angle adjustment operation for mirror angle adjustment and reverse-shift-activated operation initiated by gear-shifting. That is, the changer 40 is normally connected to the vertical mirror angle control lever 14 which is operated by the driver to adjust the mirror angle in the up-and-down direction by running the up/down drive motor 10. On the other hand, to perform reverse-shift-activated operation by running the up/down drive motor 10 with the motor driver 24, the changer 40 gets connected to the motor driver 24 by being switched by a microcomputer 22. During the reverse-shift-activated operation, the microcomputer 22 drives the up/down drive motor 10 via the motor driver 24 according to signals sent from the gear-shift position detector 18 and turning amount setter 20.

To detect pulses (motor driving pulses) generated by switching of brushes when the up/down drive motor 10 rotates during reverse-shift-activated operation, a pulse detector 34 is installed on feed lines 26 and 28 for use to supply electric power from the motor driver 24 to the up/down drive motor 10. The pulse detector 34 detects the motor driving pulses by a well-known method based on a signal detected by a pick-up coil or resistor (not shown) inserted, for example, in the feed lines 26 and 28. That is, the pulse detector 34 inputs the signal detected by the pick-up coil or resistor, shapes a waveform of the signal at a predetermined threshold, and thereby detects the pulses generated by switching of the brushes. The microcomputer 22 counts the pulses output from the pulse detector 34 by an internal counter 41, thereby detects the rotation amount of the up/down drive motor 10, and controls the up/down drive motor 10 during the reverse-shift-activated operation according to the pulse count. Also, the microcomputer 22 is equipped with an internal timer 43, which is used to measure the end times of pulse rejection periods.

Figure 3:
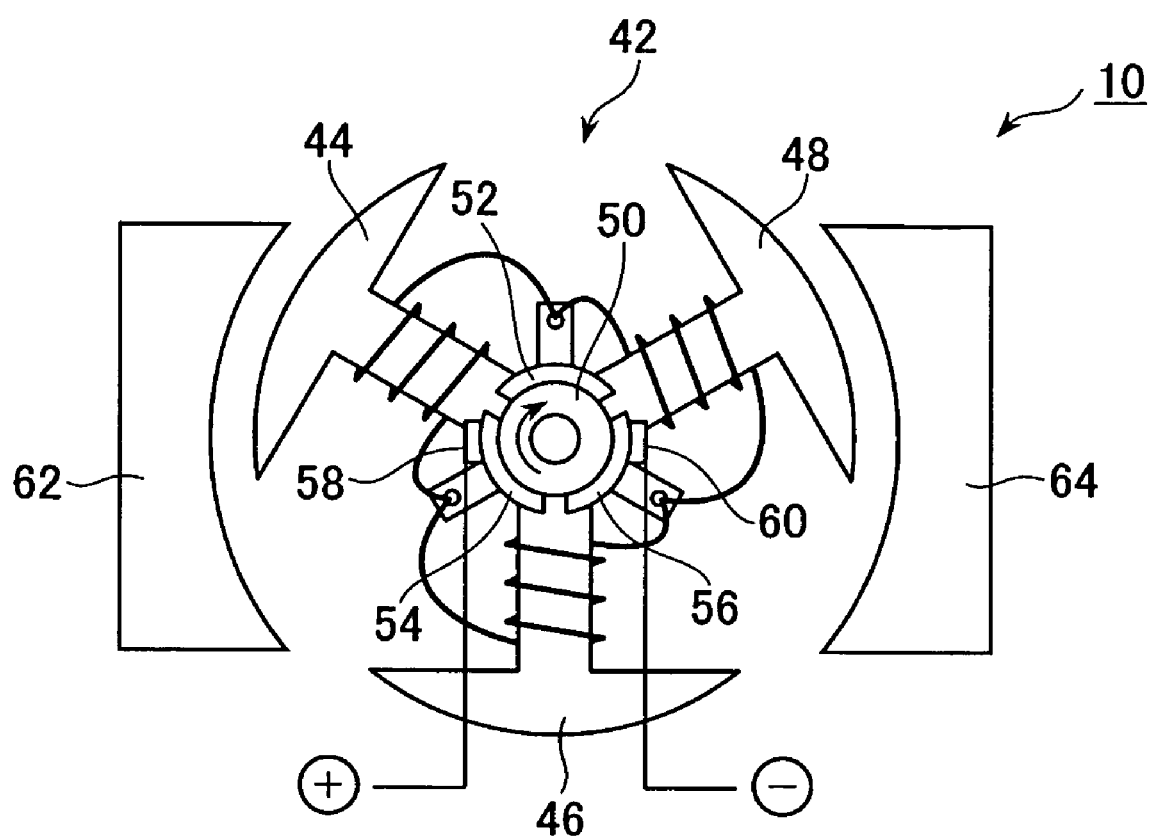
FIG. 3 is a schematic diagram showing a structure of the motor 10 in FIG. 2.

Now, the pulses generated from the motor 10 by switching of the brushes will be described. FIG. 3 schematically shows a construction of the motor 10. FIG. 3 illustrates a case in which the motor 10 is a three-pole brush motor. A rotor 42 consists of three magnetic poles 44, 46, and 48 formed circumferentially at equal intervals. On the outer surface of a rotational shaft 50 of the rotor 42, three commutator bars 52, 54, and 56 are disposed circumferentially at equal intervals. On both sides of the rotational shaft 50, brushes 58 and 60 are placed opposite to each other. Each of the brushes 58 and 60 comes into contact with one of the commutator bars 52, 54, and 56. As the rotor 42 rotates, the contact positions between the brushes 58 and 60 and the commutator bars 52, 54, and 56 change in sequence. Permanent magnets 62 and 64 are disposed on both sides of the rotor 42, constituting a stator.

Figure 4:
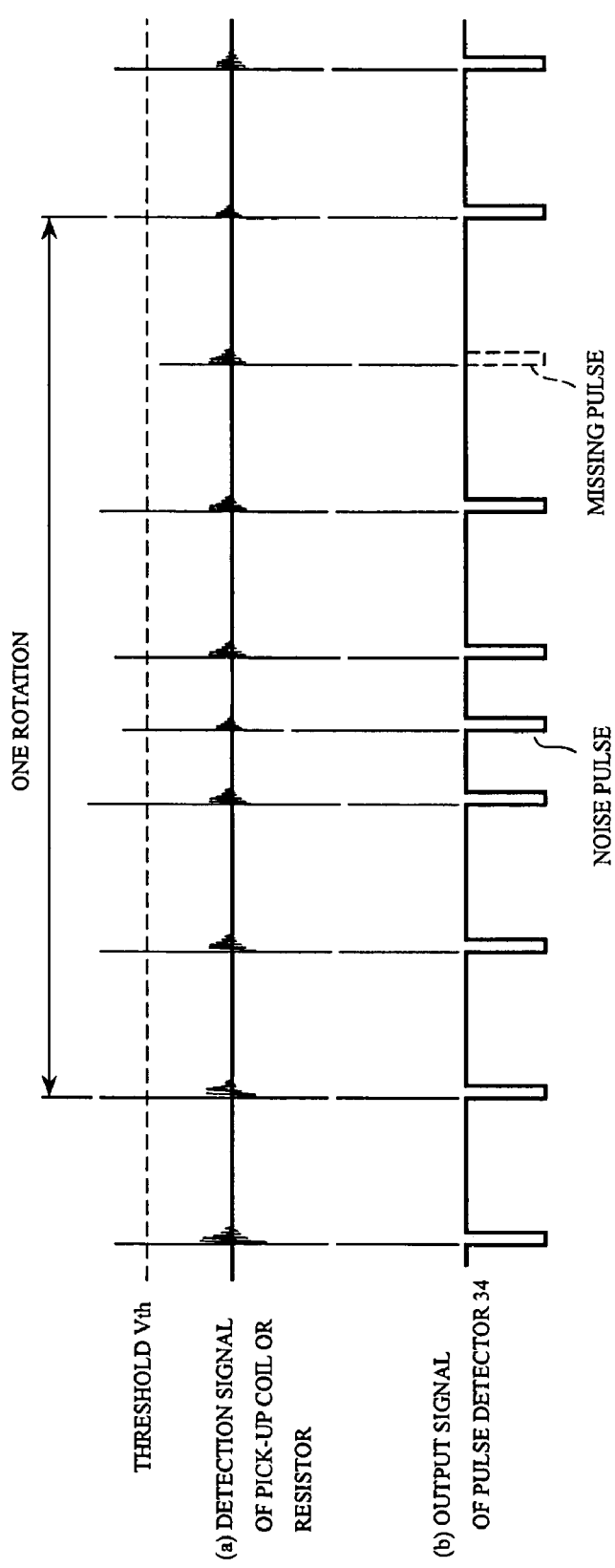
FIG. 4 is a waveform diagram showing a signal detected by a pick-up coil or resistor in the pulse detector 34 in FIG. 2 and a signal obtained by subjecting the detected signal to waveform shaping at a predetermined threshold Vth.

FIG. 4(a) shows a signal waveform detected by the pick-up coil or resistor of the pulse detector 34 in FIG. 2 when the three-pole brush motor 10 in FIG. 3 is driven at a steady-state speed. Six pulses (high-frequency signal) per rotation are obtained between both terminals of the pick-up coil or resistor as the brushes 58 and 60 change their connections with the commutator bars 52, 54, and 56 successively. Although intervals (pulse intervals) between adjacent pulses are uniform in design terms (e.g., the pulse interval is 1 msec when the motor is rotating at 10000 rpm), there are actually variations due to assembly errors of the motor 10 and the like. Besides, the signal detected by the pick-up coil or resistor sometimes contains noise pulses. Even in the pulses generated as the brushes 58 and 60 change their connections with the commutator bars 52, 54, and 56 successively, low-level pulses are sometimes detected by the pick-up coil or resistor.

The pulse detector 34 shapes the waveform of the signal detected by the pick-up coil or resistor, at a predetermined threshold Vth, but it is difficult to set the threshold Vth. That is, too low a threshold Vth makes noise pulses easier to be detected and, conversely, too high a threshold Vth makes low-level pulses prone to be missing. Thus, it is not possible to completely eliminate noise pulses and missing pulses simply by controlling the setting of the threshold Vth, and the signal detected by the pick-up coil or resistor and subjected to waveform shaping at a predetermined threshold Vth may contain noise pulses and missing pulses as shown in FIG. 4(b). Any noise pulse or missing pulse can cause a deviation between the pulse count of the counter 41 and actual turning amount of the mirror surface, and repetition of reverse-shift-activated operation will gradually increase deviations in return position.

To deal with noise pulses, each time a pulse is detected by the pulse detector 34, the microcomputer 22 sets a pulse rejection period of a predetermined length initiated by the detection of the pulse to remove any noise pulse which occurs in the pulse rejection period so that it will not be counted by the counter 41. Also, to deal with missing pulses, if no pulse is detected by the pulse detector 34 within a predetermined time after expiration of the pulse rejection period, the microcomputer 22 forcibly increments the pulse count of the counter 41 by one. Deviations between the pulse count of the counter 41 and actual turning amount of the mirror surface are avoided in this way.

Figure 5:
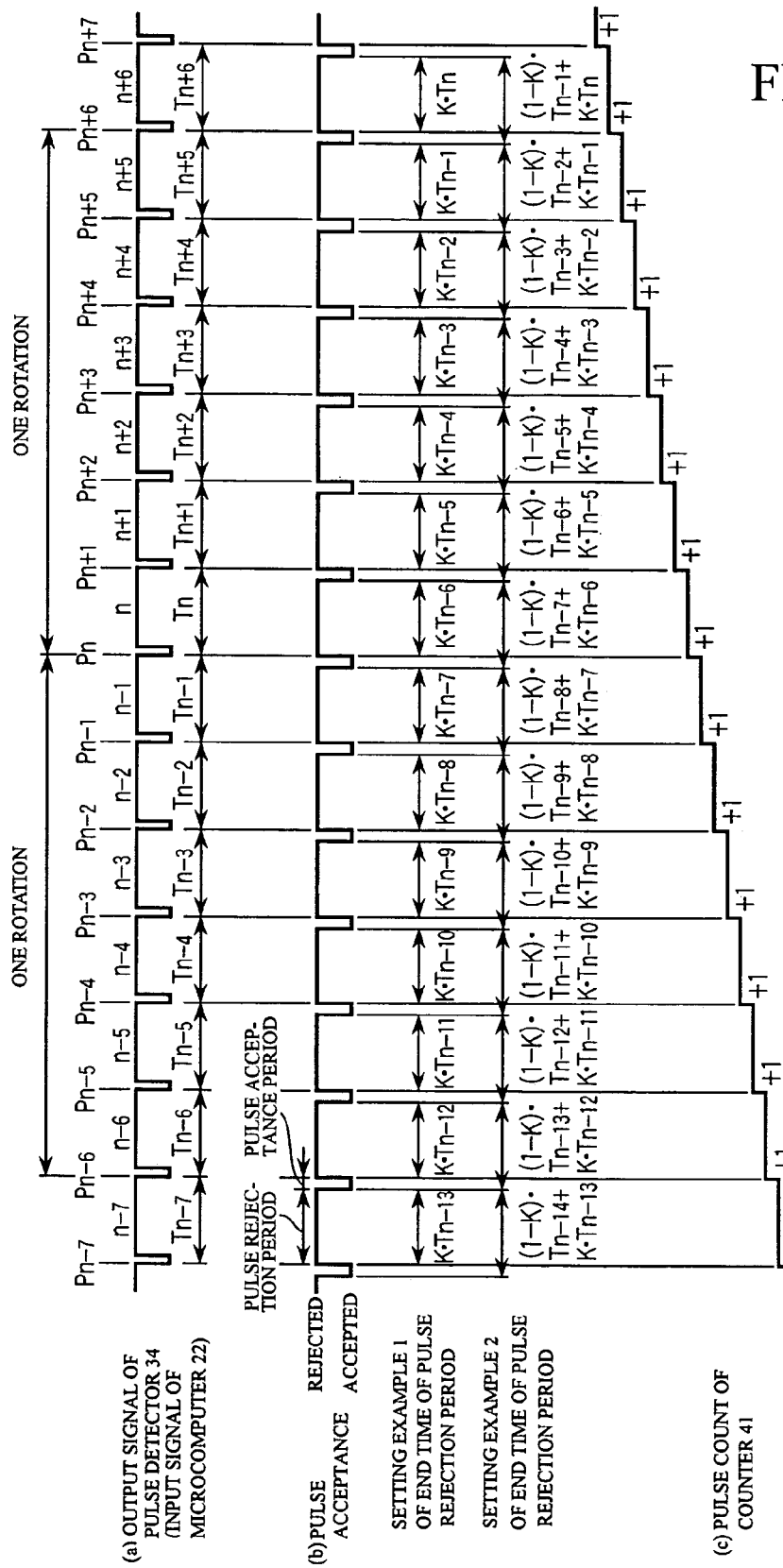
FIG. 5 is a timing chart showing an example of pulse rejection periods set by a microcomputer 22 when the three-pole brush motor 10 in FIG. 3 is running at a steady-state speed.

FIG. 5 shows an example of pulse rejection periods set by the microcomputer 22 when the three-pole brush motor 10 in FIG. 3 is running at a steady-state speed. FIG. 5(a) shows pulses inputted in the microcomputer 22 from the pulse detector 34 (condition in which there is no noise pulse or missing pulse). FIG. 5(b) shows divisions between the pulse rejection periods and pulse acceptance periods. That is, the pulse rejection period starts at the time when a pulse is inputted in the microcomputer 22 and ends after a predetermined time. The pulse acceptance period during which a pulse is accepted starts upon expiration of the pulse rejection period and ends at the time when a next pulse is inputted in the microcomputer 22. FIG. 5(c) shows changes in pulse count of the counter 41. That is, the counter 41 increments the pulse count by one each time a pulse is inputted in the microcomputer 22 during a pulse acceptance period.

The end time of the pulse rejection period in FIG. 5(b) is set based on the pulse interval at the corresponding position in the previous rotation (six zones before), for example, as shown in setting example 1 or setting example 2 below. By setting the end time of each pulse rejection period based on the pulse interval at the corresponding position (the same rotational position) in the previous rotation, it is possible to eliminate the effect of any variation in pulse intervals between adjacent pulses during steady-state operation due to assembly errors of the motor and the like. This makes it possible to set the end time of the pulse rejection period close enough to the generation time of the next normal pulse (since variations do not have effect, the pulse rejection period hardly extends over the next normal pulse even if the pulse rejection period is close enough to the next normal pulse), reducing the possibility of picking up noise pulses. This in turn makes it possible to reduce miscounting due to noise pulses or missing pulses and consequently reduce deviations in return position caused by repetition of turning operation.

[Example of setting the end time of a pulse rejection period 1]

The pulse rejection period is ended when a predetermined time elapses from the start point of the pulse rejection period, where the predetermined time is calculated by multiplying a pulse interval at a corresponding position one rotation before by a coefficient K (K is given by ½<K<1; e.g., 0.8). Specifically, as shown in FIG. 5, let n denote the pulse zone between a pulse $P_n$ and the next pulse $P_{n+1}$, let $T_n$ denote the duration of the pulse zone n, and let n−6 denote the pulse zone between the pulse $P_{n-6}$ at the corresponding position one rotation before and the next pulse $P_{n-5}$, and let $T_{n-6}$ denote the duration of the pulse zone n−6, then the pulse rejection period in the pulse zone n initiated by the generation of the pulse $P_n$ is ended after a time of $K*T_{n-6}$ from the generation time of the pulse $P_n$.

[Example of setting the end time of a pulse refection period 2]

The pulse rejection period is ended when a predetermined time elapses from the end point of the pulse rejection period immediately preceding the current pulse rejection period, where the predetermined time is calculated as the sum of a time obtained by multiplying the pulse interval at a corresponding position one rotation before the immediately preceding pulse rejection period by a coefficient 1−K (K is given by ½<K <1; e.g., 0.8) and a time obtained by multiplying the pulse interval at a corresponding position one rotation before the current pulse rejection period by the coefficient K. Specifically, as shown in FIG. 5, let n denote the pulse zone between a pulse $P_n$ and the next pulse $P_{n+1}$, let $T_n$ denote the duration of the pulse zone n, let n−6 denote the pulse zone between the pulse $P_{n-6}$ at the corresponding position one rotation before and the next pulse $P_{n-5}$, let $T_{n-6}$ denote the duration of the pulse zone n−6, let n−1 denote the pulse zone between the pulse Pn−1 which is one pulse before the pulse Pn and the pulse Pn, let $T_{n-1}$ denote the duration of the pulse zone n−1, let n−7 denote the pulse zone between the pulse $P_{n-7}$ at the corresponding position one rotation before and the next pulse $P_{n-6}$, and let $T_{n-7}$ denote the duration of the pulse zone n−7, then the pulse rejection period in the pulse zone n initiated by the generation of the pulse $P_n$ is ended after a time of $(1-K)*T_{n-7}+K*T_{n-6}$ from the end point (start point of the pulse acceptance period) of the pulse rejection period in the pulse zone n−1.

A minimum value can be set for the value of $K*T_{n-6}$ in setting examples 1 and 2 according to maximum rotational speed of the motor 10. If the maximum rotational speed of the motor 10 is 15000 rpm according to specifications (the pulse interval in design terms is 667 μsec), the minimum value can be set, for example, at 300 μsec.

Figure 6:
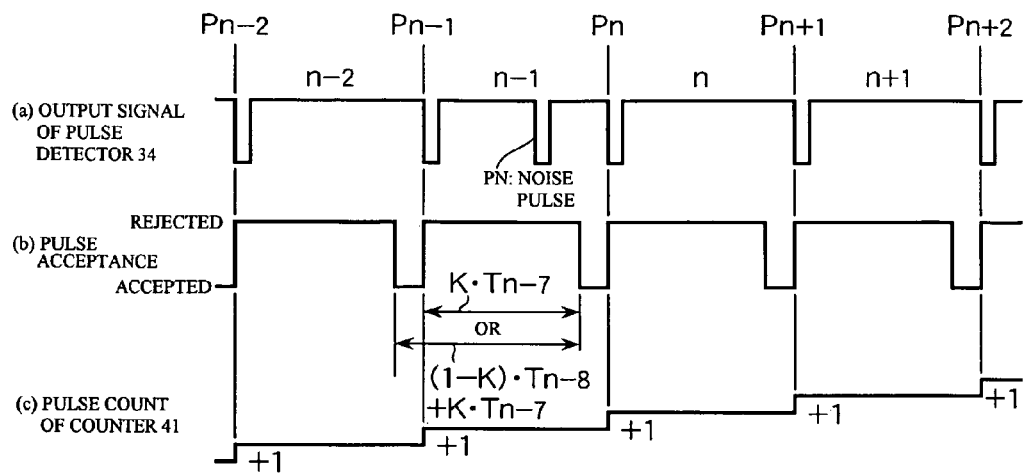
FIG. 6 is a timing chart showing an example of noise pulse removal operation performed by the microcomputer 22.

FIG. 6 shows an example of noise pulse removal operation performed by the microcomputer 22. In this example, a noise pulse PN is generated at the midpoint position of the pulse zone n−1 as shown in FIG. 6(a). In the pulse zone n−1, as shown in FIG. 6(b), the pulse rejection period initiated by the generation of the pulse $P_{n-1}$ is ended after a time of $K*T_{n-7}$ from the generation time of the pulse $P_{n-1}$ or ended after a time of $(1-K)*T_{n-8}+K*T_{n-7}$ from the end point of the pulse rejection period (start point of the pulse acceptance period) in the pulse zone n−2, and the noise pulse PN generated during the pulse rejection period is removed by the pulse rejection period. Consequently, as shown in FIG. 6(c), the counter 41 goes on counting pulses without causing an error due to the noise pulse PN.

Figure 7:
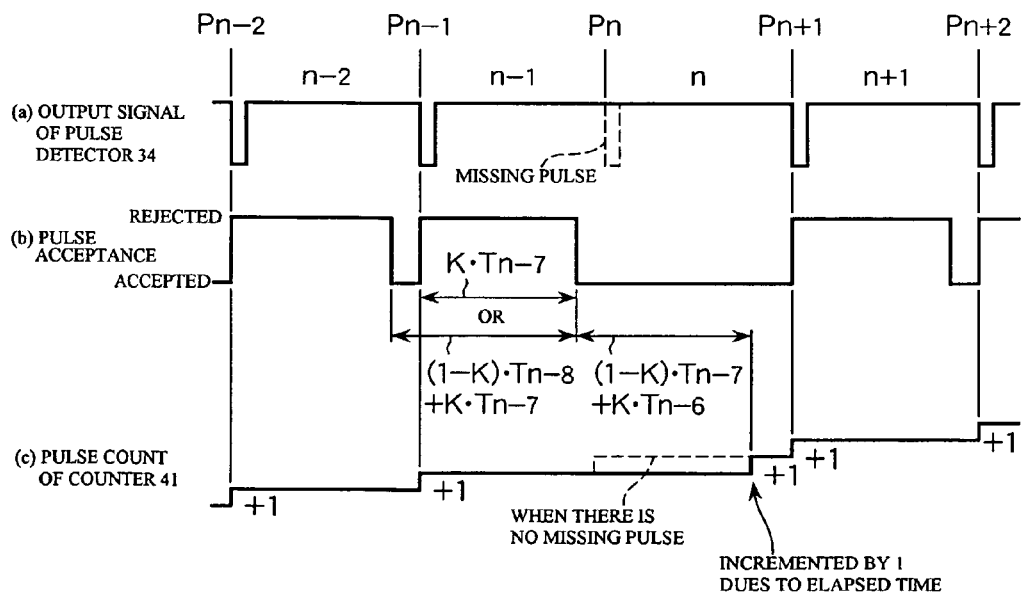
FIG. 7 is a timing chart showing an example of compensation operation for a missing pulse performed by the microcomputer 22.

FIG. 7 shows an example of compensation operation for a missing pulse performed by the microcomputer 22. In this example, the pulse $P_n$ is missing as shown in FIG. 7(a). As shown in FIG. 7(b), the pulse rejection period initiated by the pulse $P_{n-1}$ is ended after a time of $K*T_{n-7}$ from the generation time of the pulse $P_{n-1}$ or ended after a time of $(1-K)*T_{n-5}+K*T_{n-7}$ from the end point of the pulse rejection period (start point of the pulse acceptance period) in the pulse zone n−2, being followed by the pulse acceptance period. The pulse $P_n$ is missing just after the pulse rejection period is ended, and thus the pulse acceptance period follows immediately. Then, after a time of $(1-K)*T_{-7}+K*T_{n-6}$, the microcomputer 22 forcibly increments the pulse count of the counter 41 by one as shown in FIG. 7(c). Consequently, the counter 41 goes on counting pulses without causing an error due to the missing pulse.

If there is any missing pulse, pulse intervals are not measured in two zones before and after the missing pulse. Consequently, pulse interval data in the previous rotation needed to define the end points of the pulse rejection periods for each corresponding position one rotation after the two zones are not available. To deal with this, if there is any missing pulse, the last pulse intervals measured at each corresponding position in a rotation preceding the position in which the pulse is missing (i.e., the pulse intervals measured at corresponding positions one rotation before, if available) are used as the pulse intervals which define the end points of the pulse rejection periods at each corresponding position one rotation after the two zones whose pulse intervals are not measured due to the missing pulse.

As examples of setting the end time of a pulse rejection period, descriptions have been given of a method which involves ending the pulse rejection period when a predetermined time elapses from the start point of the pulse rejection period, where the predetermined time is calculated by multiplying a pulse interval at a corresponding position one rotation before by a coefficient K (setting example 1), and a method which involves ending the pulse rejection period, when a predetermined time elapses from the end point of the pulse rejection period, where the predetermined time is calculated as the sum of a time obtained by multiplying the pulse interval at a corresponding position one rotation before the immediately preceding pulse rejection period by a coefficient 1−K and a time obtained by multiplying the pulse interval at a corresponding position one rotation before the current pulse rejection period by the coefficient K (setting example 2). If a noise pulse is detected during a pulse acceptance period, the pulse count of the counter 41 is more prone to error in the case of setting example 1 than in setting example 2. This will be described with reference to FIG. 8.

Figure 8:
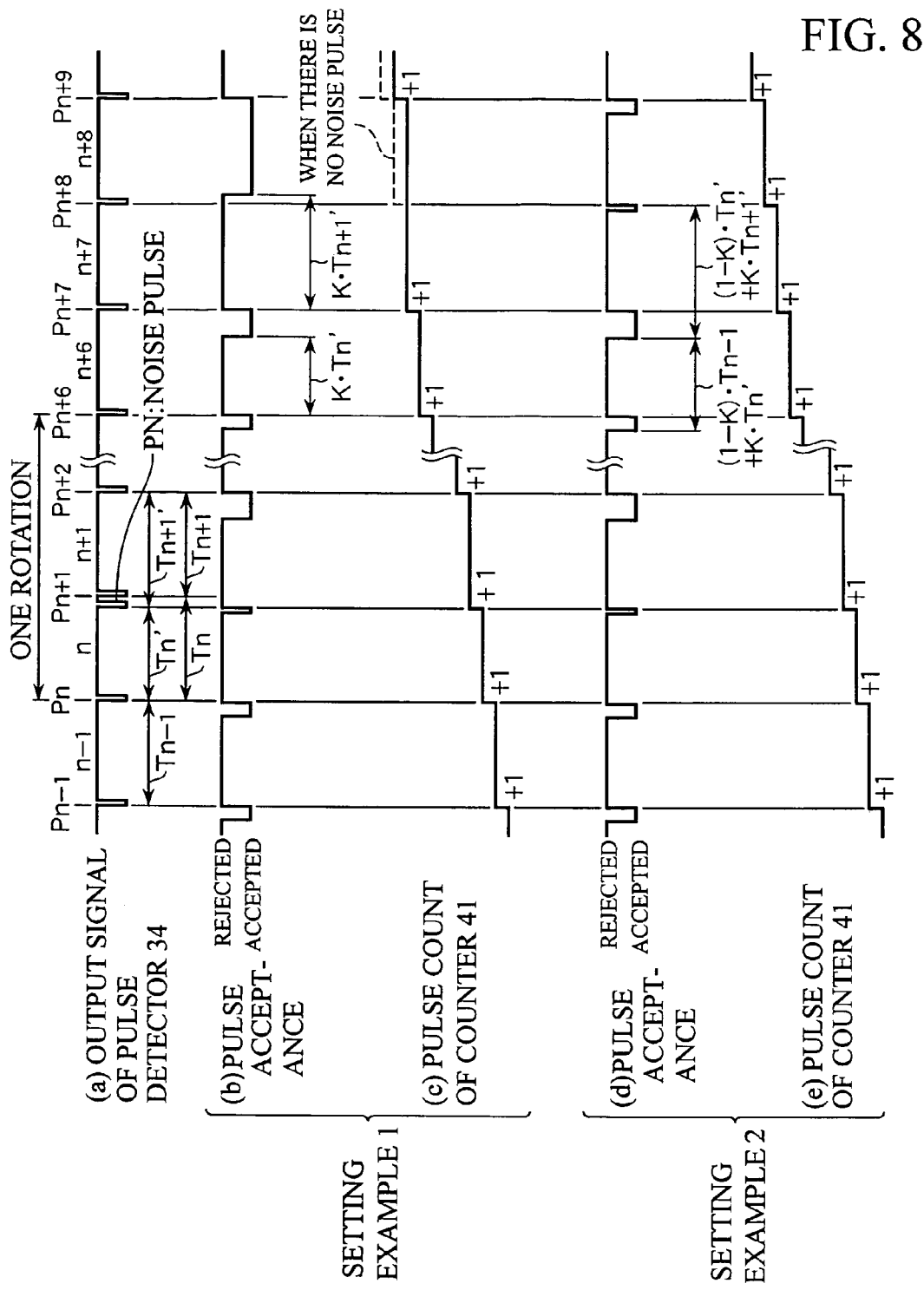
FIG. 8 is a timing chart showing difference in operation due to difference in the method of setting the end time of a pulse rejection period when a noise pulse is detected during a pulse acceptance period.

FIG. 8 shows difference in operation between setting example 1 and setting example 2 when a noise pulse PN is detected during a pulse acceptance period. In this example, in a pulse zone n between normal pulses $P_n$ and $P_{n+1}$, a noise pulse PN is generated just before the pulse $P_{n+1}$ as shown in FIG. 8(a). In both setting example 1 in FIG. 8(b) and setting example 2 in FIG. 8(d), since the noise pulse PN is generated within a pulse acceptance period, the pulse count of the counter 41 is incremented by one upon generation of the noise pulse PN as shown in FIG. 8(c) and FIG. 8(e) respectively. Also, as shown in FIG. 8(b) and FIG. 8(d) individually, upon generation of the noise pulse PN, the next pulse rejection period is initiated and the normal pulse $P_{n+1}$ is removed.

According to setting example 1, a pulse interval (time interval between the pulses $P_n$ and PN) $T_n'$ measured in the pulse zone n in which the noise pulse PN is generated is shorter than the normal pulse interval (time interval between the pulses $P_n$ and $P_{n+1}$)$T_n$. Therefore, the pulse interval (time interval between the pulses PN and $P_{n+2}$)$T_{n+1}'$ measured in the next pulse zone n+1 is longer than the normal pulse interval (time interval between the pulses $P_{n+1}$ and $P_{n+2}$) $T_{n+1}$ conversely. Consequently, the end time of the pulse rejection period in the pulse zone n+7 one rotation after the pulse zone n+1 is later by a time of $K*(T_{n+1}'-T_{n+1})$ than the time when there is no noise pulse PN, the next normal pulse $P_{n+8}$ is removed (masked) by the pulse rejection period, and the counter 41 produces an error of −1 in the pulse count.

On the other hand, according to setting example 2, the pulse rejection period in the pulse zone n+7 one rotation after the pulse zone n+1 is ended after a time of $(1-K)*T_n' + K*T_{n+1}'$ from the end point of the pulse rejection period in the pulse zone n+6, canceling out a time of $(1-K)*(T_n-T_n')$ out of the delay of $K*(T_{n+1}'-T_{n+1})$, and reducing the delay in the end time of the pulse rejection period in the pulse zone n+7 accordingly. Consequently, the pulse rejection period in the pulse zone n+7 ends before the next normal pulse $P_{n+8}$ is generated, and thus the normal pulse $P_{n+8}$ is not removed and the counter 41 produces no error in the pulse count. Thus, setting example 2 is less likely to produce counting error due to noise pulses than setting example 1.

Figure 9:
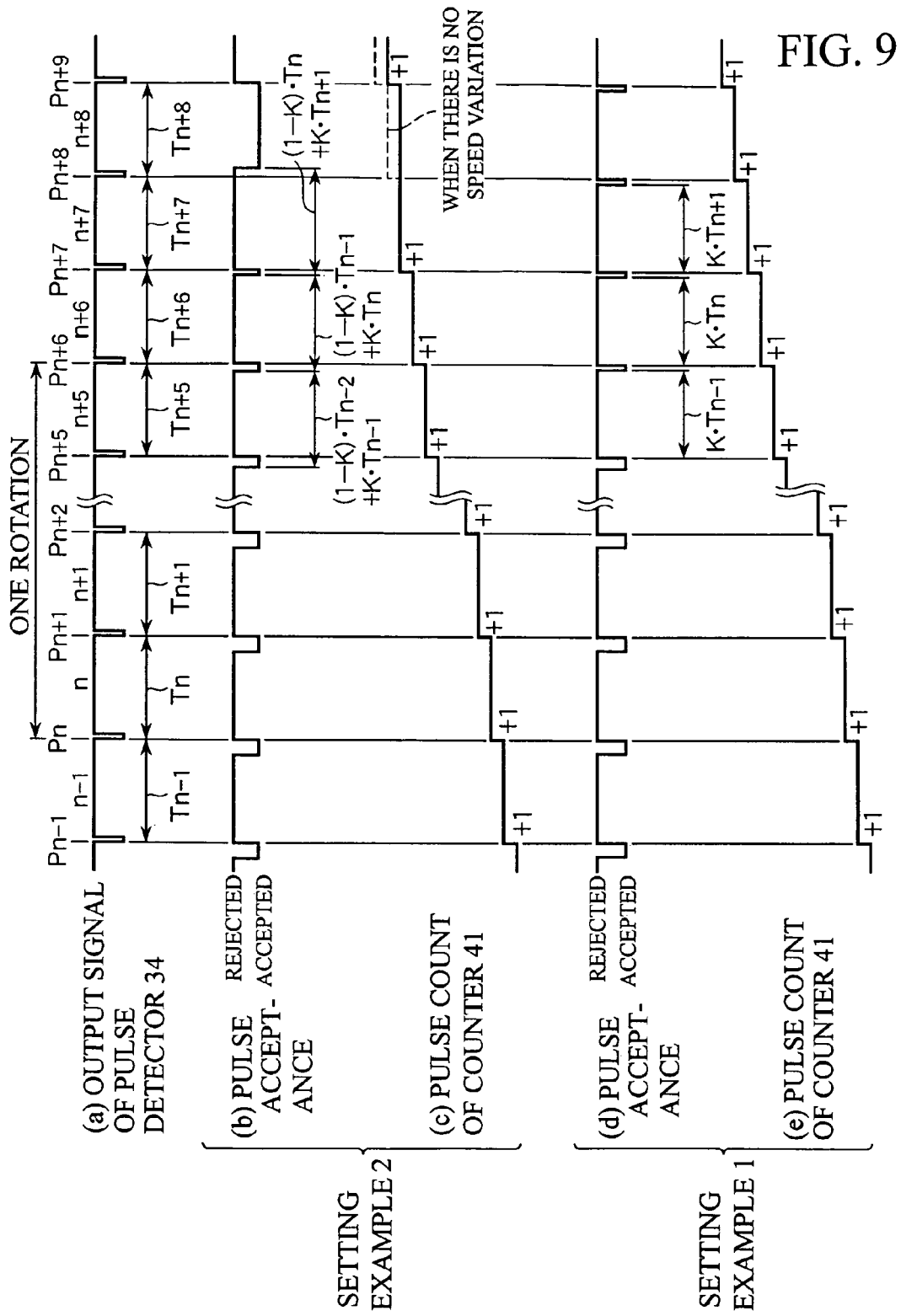
FIG. 9 is a timing chart showing difference in operation due to difference in the method of setting the end time of a pulse rejection period when motor speed increases during steady-state operation for some reasons.

However, setting example 2 is more liable to produce error in the pulse count of the counter 41 than setting example 1 if the motor speed increases during steady-state operation for some reasons. This will be described with reference to FIG. 9. FIG. 9 shows difference in operation between setting example 1 and setting example 2 when the motor speed becomes higher than in the previous rotation during steady-state operation for some reasons. Since the motor speed is higher than in the previous rotation, pulse intervals have the following relationships as shown in FIG. 9(a): $T_{n+5}<T_{n-n}$, $T_{n+6}<T_n$, $T_{n+7}<T_{n+1}$ According to setting example 2, as shown in FIG. 9(b), the pulse rejection period in the pulse zone n+6 is ended after a time of $(1-K)*T_{n-1}+K*T_n$ from the end time of the pulse rejection period in the pulse zone n+5 and the pulse rejection period in the pulse zone n+7 is ended after a time of $(1-K)*T_n+K*T_{n+1}$ from the end time of the pulse rejection period in the pulse zone n+6. On the other hand, according to setting example 1, as shown in FIG. 9(d), the pulse rejection period in the pulse zone n+6 is ended after a time of $K*T_n$ from the generation of the pulse $P_{n+6}$ and the pulse rejection period in the pulse zone n+7 is ended after a time of $K*T_{n+1}$, from the generation of the pulse $P_{n+7}$.

According to setting example 2, the end time of the pulse rejection period in the pulse zone n+6 (i.e., the start time of the pulse acceptance period) is delayed for a time of $(1-K)*(T_{n-1}-T_{n+5})$ compared to setting example 1 and the delays are accumulated after each pulse zone. Consequently, as shown in FIG. 9(b), the end time of the pulse rejection period in the pulse zone n+7 lags behind the generation time of the normal pulse $P_{n+8}$, and thus the normal pulse $P_{n+8}$ is removed by the pulse rejection period and the counter 41 produces an error of −1 in the pulse count as shown in FIG. 9(c).

On the other hand, according to setting example 1, the start times of the pulse acceptance periods always coincide with the generation times of pulses, and thus there is no accumulation of delays in the end times of pulse rejection periods unlike setting example 2. Consequently, the pulse rejection period in the pulse zone n+7 ends before the normal pulse $P_{n+8}$ is generated, and thus the normal pulse $P_{n+8}$ is not removed and the counter 41 counts pulses correctly as shown in FIG. 9(e). Thus, if the motor speed increases during steady-state operation for some reasons, setting example 1 is less likely to produce counting error than setting example 2.

Thus, possible methods for setting the end times of pulse rejection periods include methods which use setting example 1 or setting example 2 alone and methods which use setting example 1 and setting example 2 in combination, allowing for the operation used when a noise pulse PN is detected (described with reference to FIG. 8) as well as for the operation used when the motor speed increases (described with reference to FIG. 9). The methods which use setting example 1 and setting example 2 in combination include, for example, a method which uses setting example 1 when the current pulse interval<the corresponding pulse interval one rotation before (six pulses before), and uses setting example 2 when the current pulse interval≧the corresponding pulse interval one rotation before (six pulses before).

Figure 1:
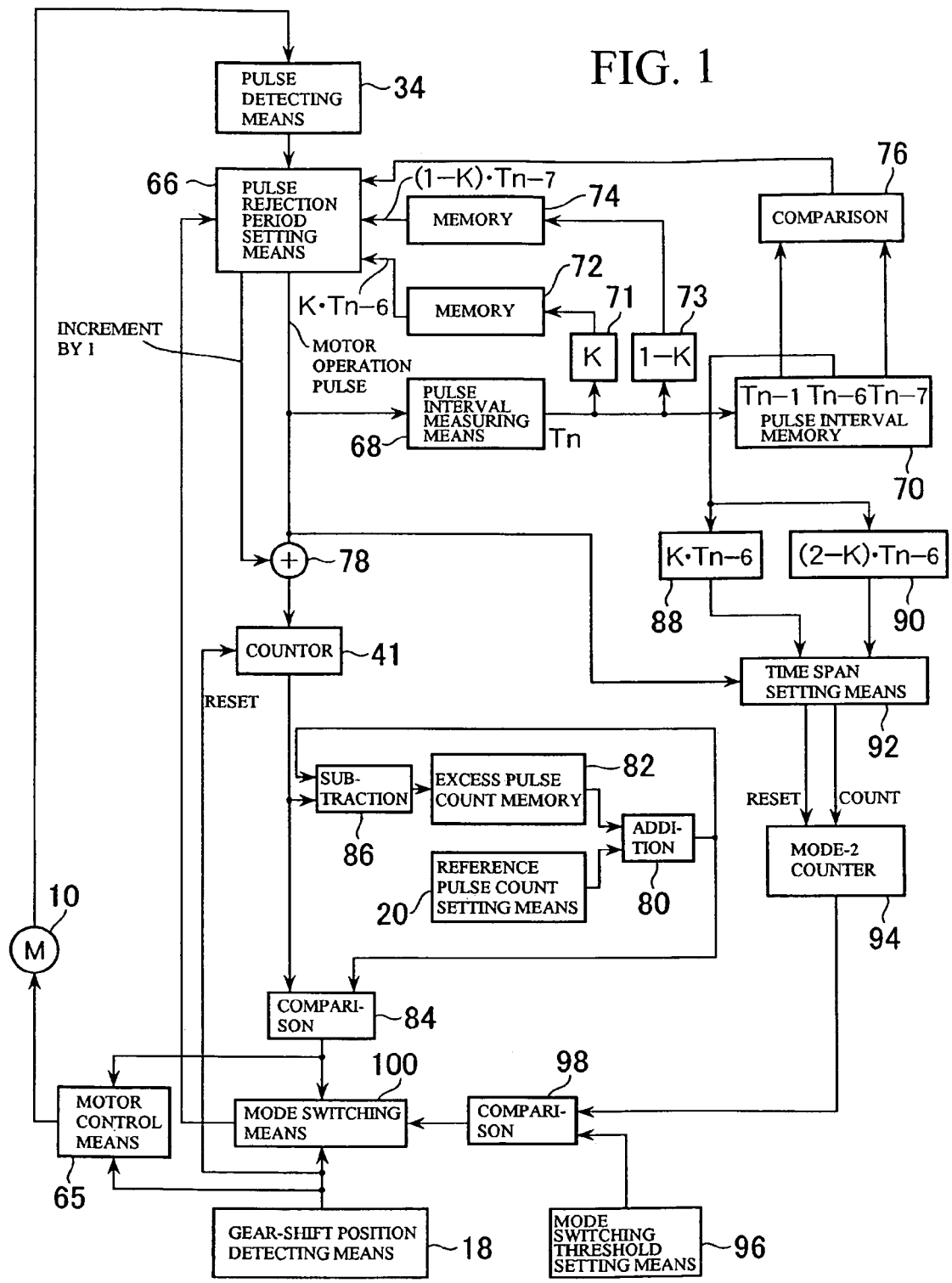
FIG. 1 is a functional block diagram for use to implement reverse-shift-activated operation on a mirror angle control apparatus in FIG. 2.

Next, description will be given of control performed by the mirror angle control apparatus in FIG. 2 during reverse-shift-activated operation. The control is performed by a program installed on the microcomputer 22 in FIG. 2. A functional block for the program is shown in FIG. 1. The method adopted in this functional block uses setting example 1 and setting example 2 in combination to set the end times of pulse rejection periods. In FIG. 1, gear-shift position detecting means 18 (which corresponds to the gear-shift position detector 18 in FIG. 2) detects the operating position of the gear-shift lever. Motor control means 65 starts running the up/down drive motor 10 in such a direction as to turn the mirror surface downward, simultaneously as gear-shifting means of a vehicle is set to the reverse position. Also, the motor control means 65 starts running the up/down drive motor 10 in such a direction as to return the mirror surface to its original position by moving the mirror surface upward, simultaneously as the gear-shift lever is switched to another operating position from the reverse position.

Pulse detecting means 34 (which corresponds to the pulse detector 34 in FIG. 2) detects a pulse generated by the up/down drive motor 10 and inputs the pulse in pulse rejection period setting means 66. Pulse rejection period setting means 66 sets a pulse rejection period which is initiated by the input of the pulse, removes the pulse inputted within the pulse rejection period by determining it to be a noise pulse, and outputs any pulse inputted during a pulse acceptance period following the pulse rejection period. A counter 41 (which corresponds to the counter 41 in FIG. 2) is reset to 0 each time a command for a reverse-shift-activated operation is given (i.e., the gear-shift lever is set to the reverse position or switched to another operating position from the reverse position) and counts the pulse outputted from the pulse rejection period setting means 66 subsequently.

Pulse interval measuring means 68 sequentially measures the time intervals of each pulse outputted by the pulse rejection period setting means 66. A pulse interval memory 70 stores the measured pulse intervals one after another. If the pulse zone n is being measured currently, a measured pulse interval $T_{n-1}$ of the pulse zone n−1 one zone before, measured pulse interval $T_{n-6}$ of the pulse zone n−6 six zones before, and measured pulse interval $T_{n-7}$ of the pulse zone n−7 seven zones before are read out of the pulse interval memory 70. Earlier measured pulse intervals are unnecessary, and are replaced by new measured pulse intervals one after another. Each time a new measured pulse interval is stored in the pulse interval memory 70, comparing means 76 compares the measured pulse interval $T_{n-1}$ of the pulse zone n−1 one zone before the current pulse zone with the measured pulse interval $T_{n-7}$ of the pulse zone n−7 seven zones before the current pulse zone to determine whether:

$T_{n-1}<T_{n-7}$ or
$T_{n-1}≧T_{n-7}$

Coefficient assigning means 71 assigns a coefficient K (e.g., K=0.8) to the pulse intervals measured by the pulse interval measuring means 68 and stores them in a memory 72 one after another. Coefficient assigning means 73 assigns a coefficient (1−K) to the pulse intervals measured by the pulse interval measuring means 68 and stores them in a memory 74 one after another. A value $K^*T_{n-6}$ of the pulse zone n−6 six zones before the pulse zone being measured currently is read out of the memory 72. A value $(1-K)^*T_{n-7}$ of the pulse zone n−7 seven zones before the pulse zone being measured currently is read out of the memory 74. Data earlier than $K^*T_{n-6}$ in the memory 72 and data earlier than $(1-K)^*T_{n-7}$ in the memory 74 are unnecessary, and are replaced by new data one after another.

If the comparison result produced by the comparing means 76 is $T_{n-1}<T_{n-7}$, the pulse rejection period setting means 66 uses setting example 1 and ends the pulse rejection period in the current pulse zone n initiated by the pulse $P_n$, after a time of $K^*T_{n-6}$ from the generation time of the pulse $P_n$. On the other hand, if the comparison result is $T_{n-1} \geq T_{n-7}$, the pulse rejection period setting means 66 uses setting example 2 and ends the pulse rejection period in the current pulse zone n initiated by the pulse $P_n$, after a time of $(1-K)^*T_{n-7}+K^*T_{n-6}$ from the end point of the pulse rejection period (start point of the pulse acceptance period) in the immediately preceding pulse zone n−1. If no pulse is obtained within the time of $(1-K)^*T_{n-7}+K^*T_{n-6}$ from the end point of the pulse rejection period in the immediately preceding pulse zone n−1, the pulse rejection period setting means 66 determines that there is a missing pulse and forcibly increments the pulse count of the counter 41 by one via a summation point 78.

Reference pulse count setting means 20 (which corresponds to the turning amount setter 20 in FIG. 2) sets a reference pulse count of the counter 41, where the reference pulse count corresponds to a reference value of the turning amount by which the mirror surface is turned downward during reverse-shift-activated operation. An excess pulse count memory 82 stores an excess pulse count which represents an excess amount over a target pulse count (target turning amount) used to drive the up/down drive motor 10 at the previous time. Adding means 80 adds the excess pulse count to the reference pulse count and outputs the result as the next target pulse count. Comparing means 84 compares the pulse count of the counter 41 with the target pulse count outputted from the adding means 80 when the up/down drive motor 10 is running during reverse-shift-activated operation, and outputs a match signal (Target Pulse Count Reached signal) when the pulse count of the counter 41 reaches the target pulse count. When a Target Pulse Count Reached signal is outputted, the motor control means 65 stops power supply to the up/down drive motor 10. The up/down drive motor 10 coasts for a short time even after the power supply is stopped, and counter-electromotive force generated by the coasting produces some pulses. The pulses produced by the coasting are detected by the pulse detecting means 34 and causes the counter 41 to increment the pulse count further. Thus, when the up/down drive motor 10 stops completely after the coasting, the pulse count of the counter 41 is increased by a number attributable to the coasting over the target pulse count outputted from the adding means 80. When the up/down drive motor 10 stops completely, subtracting means 86 determines an excess pulse count by subtracting the target pulse count of the adding means 80 from the pulse count of the counter 41 and updates the value to be stored in the excess pulse count memory 82 with the newly determined excess pulse count. The updated excess pulse count and the reference pulse count are added by the adding means 80 to produce a target pulse count for use in the next reverse-shift-activated operation of the up/down drive motor 10.

Figure 10:
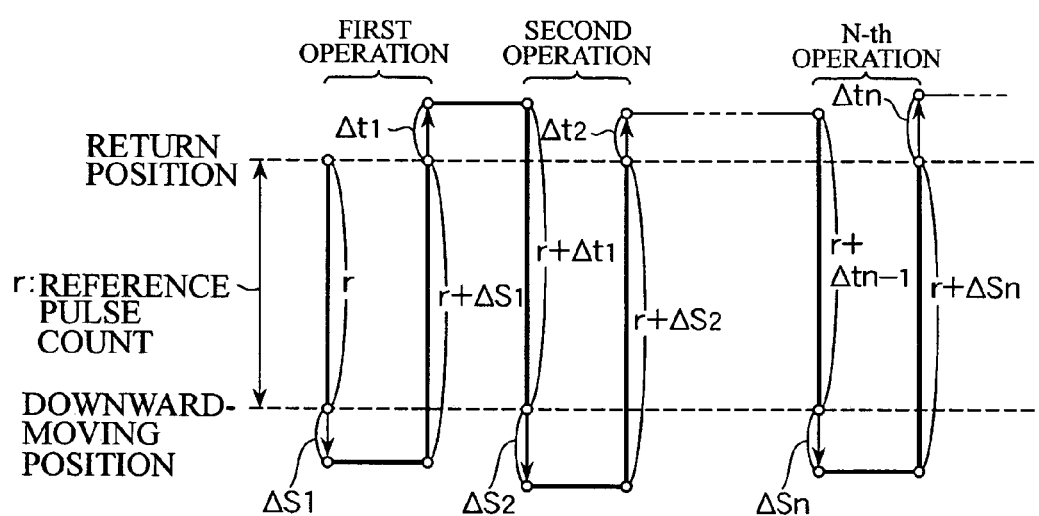
FIG. 10 is a diagram showing a relationship among reference pulse count, excess pulse count, and target pulse count when reverse-shift-activated operation is repeated.

FIG. 10 shows a relationship among reference pulse count, excess pulse count, and target pulse count when reverse-shift-activated operation is repeated. The mirror angular position before the first operation is designated as a return position and the reference pulse count is denoted by r. When the gear-shift lever is set to the reverse position; the counter 41 is reset to 0, the target pulse count is set to r, and the motor 10 runs in the downward direction. When the pulse count of the counter 41 reaches the target pulse count r, the power supply to the motor 10 is stopped and the motor 10 stops after coasting some time. Difference $\Delta s_1$, between the pulse count of the counter 41 and reference pulse count when the motor 10 stops is stored as an excess pulse count in the excess pulse count memory 82. Subsequently, when the gear-shift lever is switched to another operating position from the reverse position; the counter 41 is reset to 0, the target pulse count is set to $r+\Delta s_1$, and the motor 10 runs in the upward direction. When the pulse count of the counter 41 reaches the target pulse count $r+\Delta s_1$, the power supply to the motor 10 is stopped and the motor 10 stops after coasting some time. Difference $\Delta t_1$ between the pulse count of the counter 41 and reference pulse count when the motor 10 stops becomes a new excess pulse count and the data in the excess pulse count memory 82 is updated with the new excess pulse count $\Delta t_1$.

Next, in the second operation, when the gear-shift lever is set to the reverse position; the counter 41 is reset to 0, the target pulse count is set to $r+\Delta t_1$, and the motor 10 runs in the downward direction. When the pulse count of the counter 41 reaches the target pulse count $r+\Delta t_1$, the power supply to the motor 10 is stopped and the motor 10 stops after coasting some time. Difference $\Delta s_2$ between the pulse count of the counter 41 and reference pulse count when the motor 10 stops becomes a new excess pulse count and the data in the excess pulse count memory 82 is updated with the new excess pulse count $\Delta s_2$. Subsequently, when the gear-shift lever is switched to another operating position from the reverse position; the counter 41 is reset to 0, the target pulse count is set to $r+\Delta s_2$, and the motor 10 runs in the upward direction. When the pulse count of the counter 41 reaches the target pulse count $r+\Delta s_2$, the power supply to the motor 10 is stopped and the motor 10 stops after coasting some time. Difference $\Delta t_2$ between the pulse count of the counter 41 and reference pulse count when the motor 10 stops becomes a new excess pulse count and the data in the excess pulse count memory 82 is updated with the new excess pulse count $\Delta t_2$.

The above processes are repeated in the third and subsequent operations. In the above processes, since excess pulse counts due to coasting are not accumulated, repetition of coasting does not cause deviations in the return position-. Moreover, the amount of coasting at one time is visually imperceptible, and thus the coasting does not affect the reverse-shift-activated operation.

Referring to FIG. 1, coefficient assigning means 88 assigns a coefficient K (e.g., K=0.8) to the measured pulse interval $T_{n-6}$ six zones before the current pulse zone and outputs $K^*T_{n-6}$. Coefficient assigning means 90 assigns a coefficient 2−K(e.g., 2−K=1.2 if K=0.8) to the measured pulse interval $T_{n-6}$ six zones before the current pulse zone and outputs $(2-K)^*T_{n-6}$. Time span setting means 92 is designed to set up a pulse detection window to determine, whether the up/down drive motor 10 has entered a steady-state operation after the up/down drive motor 10 starts running during reverse-shift-activated operation. After the up/down drive motor 10 starts running, each time the latest pulse $P_n$ is outputted from the pulse rejection period setting means 66, the time span setting means 92 sets up a pulse detection window which starts after a time of $K*T_{n-6}$ from the output time of the pulse $P_n$ and ends after a time of $(2-K)*T_{n-6}$ from the output time of the pulse Pn. For example, if K=0.8, the time span setting means 92 sets up a pulse detection window which starts after a time of $0.8*T_{n-6}$ from the generation of the current pulse and ends after a time of $1.2*T_{n-6}$ from the output time of the pulse Pn. The time span setting means 92 determines whether a pulse has been outputted from the pulse rejection period setting means 66 within the pulse detection window which has been set up. The time span setting means 92 outputs a count pulse if a pulse has been outputted within the pulse detection window, and outputs a reset pulse if no pulse has been outputted within the pulse detection window.

Figure 11:
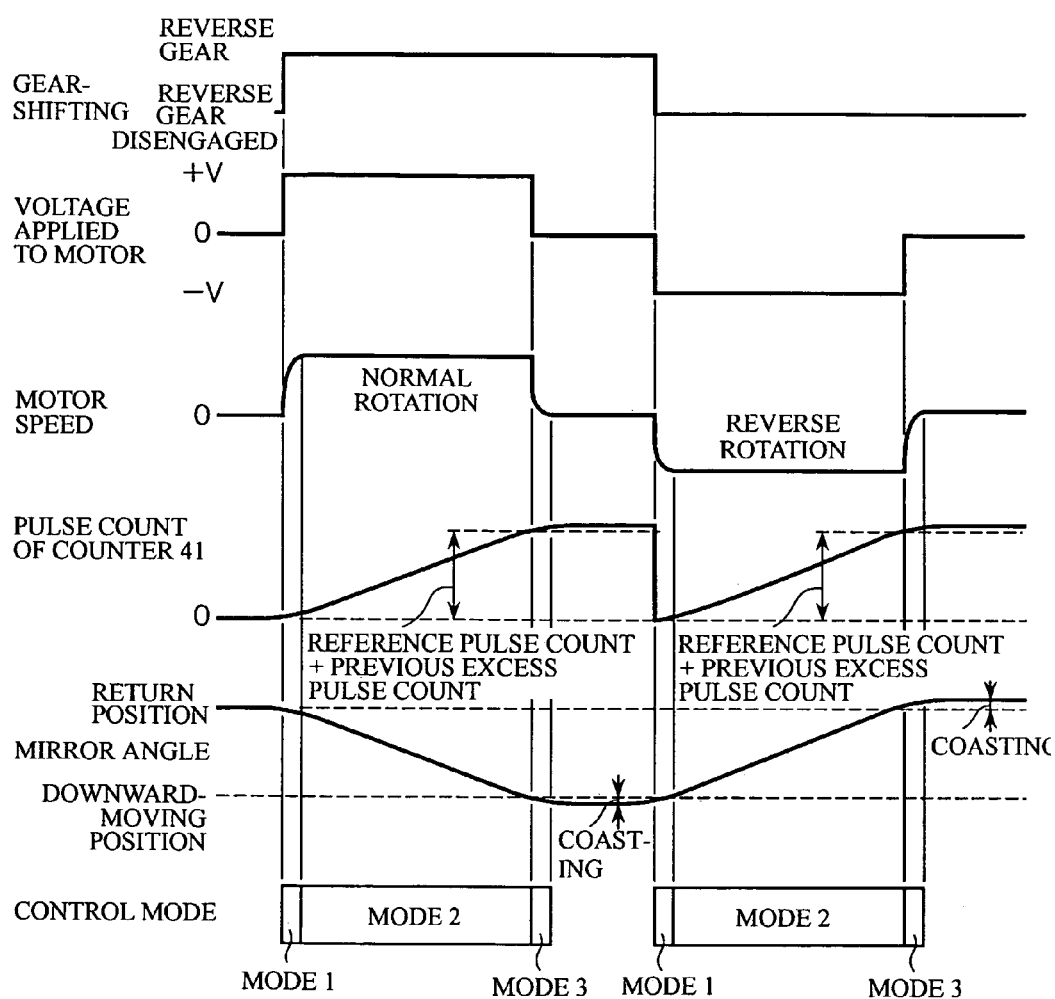
FIG. 11 is a timing chart showing transitions of operation modes during reverse-shift-activated operation.

FIG. 11 shows transitions of operation modes during reverse-shift-activated operation. Each operation of the reverse-shift-activated operation (travel from the return position to a downward position or travel from the downward position to the return position) consists of three successive operation modes as follows.

Mode 1: Accelerating operation from the time when power supply to the motor 10 is started until a steady-state speed is reached Mode 2: Steady-state operation Mode 3: Decelerating operation from the time when power supply to the motor 10 is stopped until the motor stops Referring to FIG. 1, a mode-2 counter 94 detects that the operation mode has changed from mode 1 to mode 2 during reverse-shift-activated operation. It is incremented by one each time a count pulse is outputted from the time span setting means 92, and reset to 0 each time a reset pulse is outputted from the time span-setting means 92. That is, when the motor 10 is being accelerated (mode 1), since pulses are not inputted successively within the pulse detection window set up by the time span setting means 92, the mode-2 counter 94 is reset without being incremented. On the other hand, when the motor 10 reaches a steady-state speed, since pulses are inputted successively within the pulse detection window, the mode-2 counter 94 increments its pulse count. Mode switching threshold setting means 96 sets a pulse count of the mode-2 counter 94 at which it should be determined that the operation mode has changed from mode 1 to mode 2 during the reverse-shift-activated operation. Comparing means 98 compares the pulse count of the mode-2 counter 94 with a set value of the mode switching threshold setting means 96. If the pulse count of the mode-2 counter 94 exceeds the set value of the mode switching threshold setting means 96, the comparing means 98 outputs a match signal by determining that the operation mode has changed to mode 2.

During the reverse-shift-activated operation, mode switching means 100 switches the pulse rejection period set in the pulse rejection period setting means 66 as follows according to transitions among modes, 1, 2, and 3.

(1) Mode 1

When the gear-shift lever is set to the reverse position or switched to another operating position from the reverse position (reverse gear is disengaged), a fixed pulse rejection period is set each time a pulse is inputted. The fixed pulse rejection period is set to such a length that normal pulses will not be removed when the up/down drive motor 10 is at maximum speed.

(2) Mode 2

When a match signal is outputted by the comparing means 98 and the fact of change to mode 2 is determined, the mode switching means 100 switches to the above-mentioned settings for the steady-state operation. That is, either setting example 1 or setting example 2 is used according to the decision ($T_{n-1}<T_{n-7}$ or $T_{n-1}\geq T_{n-7}$) made by the comparing means 76. In the case of a missing pulse, the pulse count of the counter 41 is forcibly incremented by one.

(3) Mode 3

When a match signal is outputted by the comparing means 84 and the fact of change to mode 3 is determined, a fixed pulse rejection period is set each time a pulse is inputted. The fixed pulse rejection period is set to such a length that normal pulses will not be removed when the up/down drive motor 10 is at maximum speed.

Figure 12:
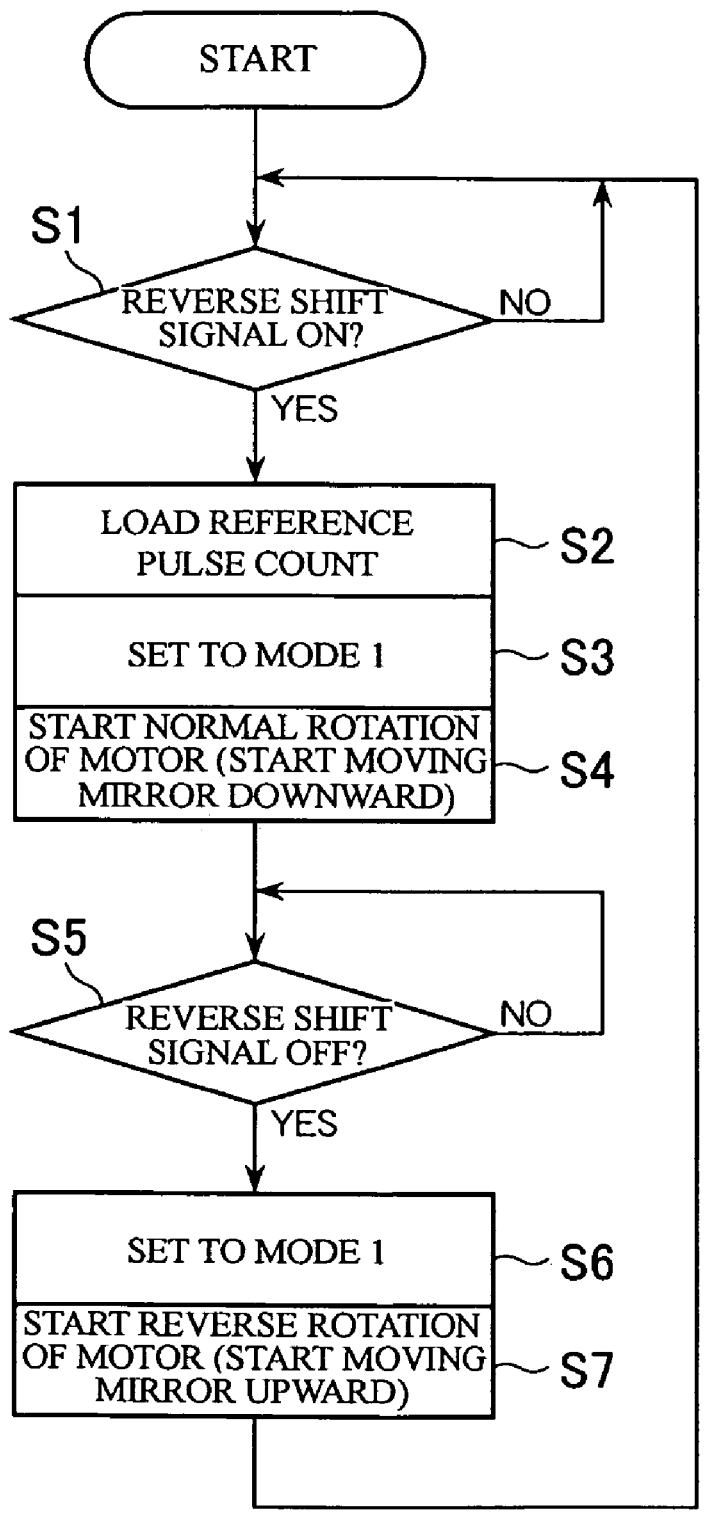
FIG. 12 is a flowchart of reverse-shift-activated operation based on the functional block in FIG. 1 and shows details of control performed just after a gear-shift lever is set to a reverse position and details of control performed just after the gear-shift lever is subsequently switched to another operating position from the reverse position.
Figure 13:
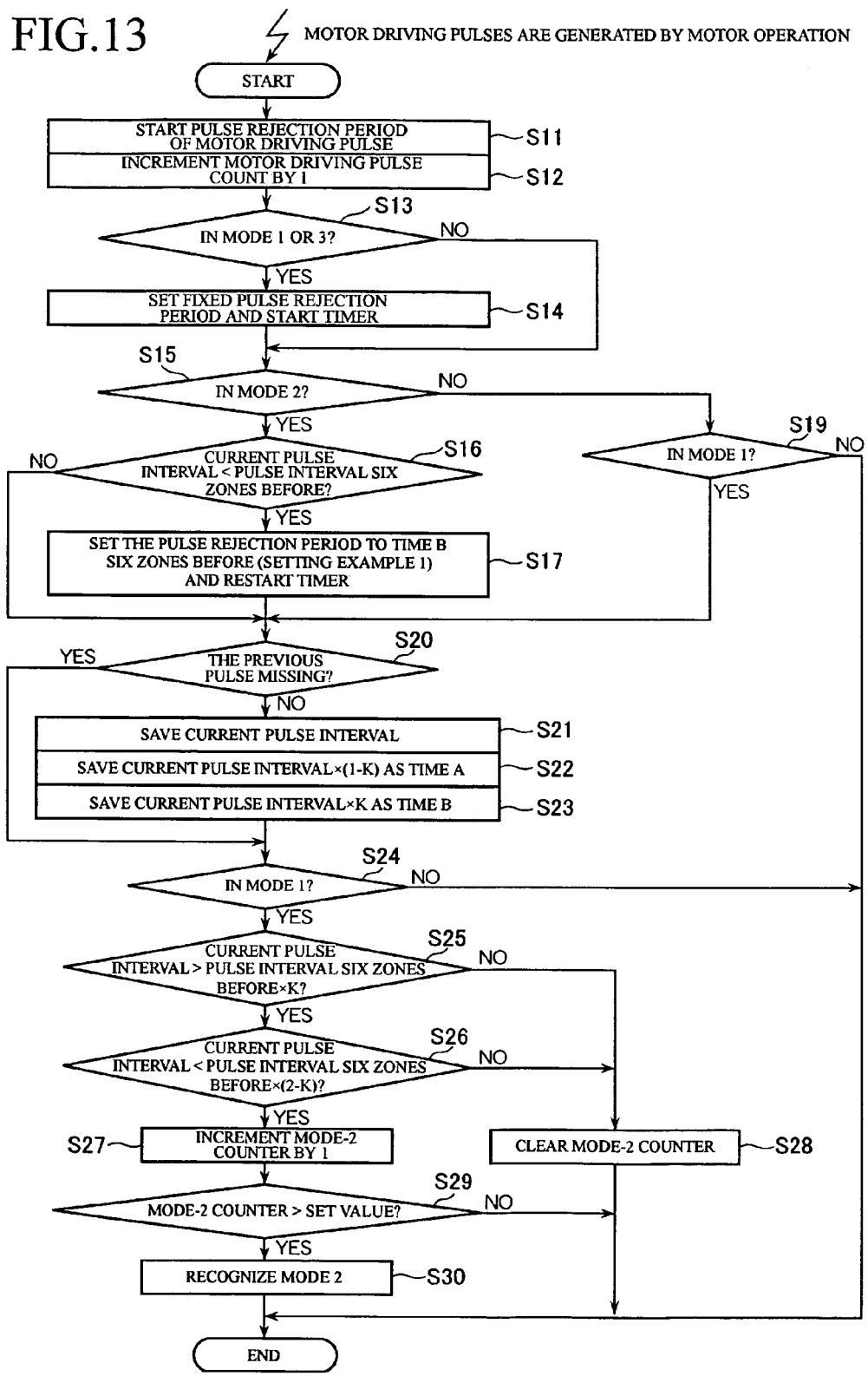
FIG. 13 is a flowchart of reverse-shift-activated operation based on the functional block in FIG. 1 and shows details of control in operation modes 1 to 3.
Figure 14:
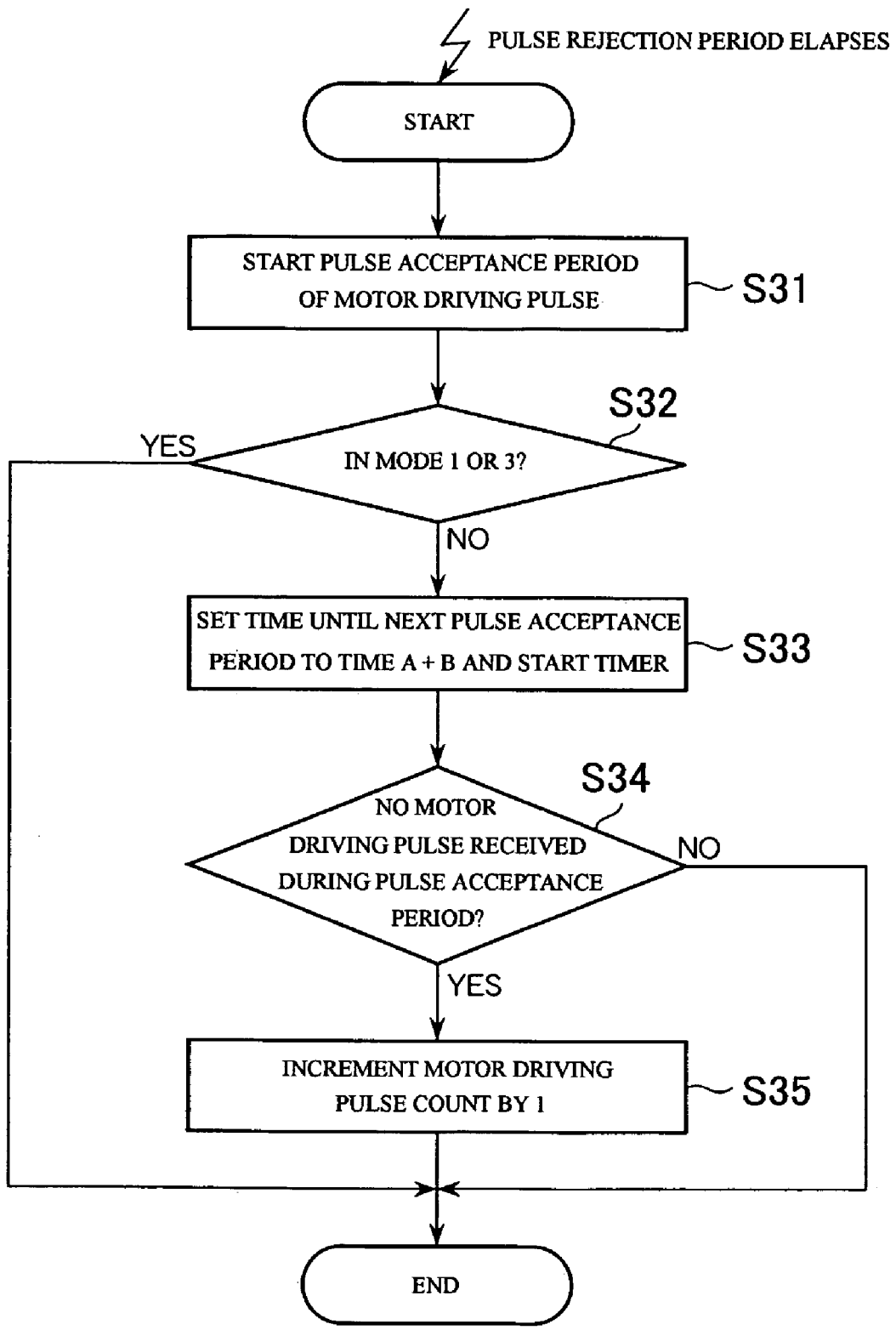
FIG. 14 is a flowchart of reverse-shift-activated operation based on the functional block in FIG. 1 and shows pulse compensation control for a missing pulse.

FIGS. 12, 13, and 14 show control flowcharts of reverse-shift-activated operation based on the functional block in FIG. 1. FIG. 12 shows details of control performed just after the gear-shift lever is set to the reverse position and details of control performed just after the gear-shift lever is subsequently switched to another operating position from the reverse position. When the gear-shift lever is set to the reverse position, a Reverse Shift Detected signal is outputted (S1) and the reference pulse count is loaded (S2). The sum of the reference pulse count and excess pulse count produced in the previous operation is set as a target pulse count. Then, the operation mode is set to mode 1 (S3), the pulse rejection period is set to a fixed period, and downward operation of the up/down drive motor 10 is started (S4). Subsequently, when the gear-shift lever is switched to another operating position from the reverse position, a Reverse Gear Disengaged signal is outputted (S5). At the same time, the sum of the reference pulse count and excess pulse count produced in the previous operation is set as a target pulse count. Then, the pulse rejection period is set to a fixed period in mode 1 (S6) and upward operation of the up/down drive motor 10 is started (S7).

FIG. 13 shows details of control in operation modes 1 to 3. The control in FIG. 13 is performed each time a motor driving pulse is generated. The control in each operation mode will be described below.

(1) Mode 1

Each time a motor driving pulse is inputted; a pulse rejection period is started (S11), the counter 41 is incremented by one (S12), and the internal timer 43 starts measuring the pulse rejection period (S13 and S14). Besides, the time interval between the previous pulse and current pulse is saved in a pulse interval memory 70 (S15, S19, S20, and S21). Also, the following operations are performed and results are saved (S22 and S23):

Time A=(1−K)×pulse interval measured this time

Time B=K×pulse interval measured this time

Out of data on the pulse intervals, time A, and time B saved during each rotation in mode 1; the data for one rotation just before the change to mode 2 is used to define the pulse rejection period in the first rotation in mode 2.

Furthermore, to monitor transition to a steady-state speed, it is determined whether the pulse interval measured this time falls within a range of between "K×the pulse interval six zones before" and "(2−K)×the pulse interval six zones before" (S24, S25, and S26). If it falls within the range, the mode-2 counter 94 is incremented by one (S27). After the mode-2 counter 94 is incremented by one, it is determined whether the pulse count of the mode-2 counter 94 has reached the value set as a mode switching threshold (S29).

If the pulse count has reached the set value, it is determined that the operation mode has been changed to mode 2 (steady-state speed) (S30) and a switch to control in mode 2 takes place. On the other hand, if the pulse interval measured this time does not fall within the range, the mode-2 counter 94 is reset to 0 and control in mode 1 is continued.

(2) Mode 2

In mode 2, each time a pulse rejection period ends, the internal timer 43 starts counting down time A+B, i.e., the sum of the time A and time B (Step S33 in FIG. 14 described later). Also, each time a motor driving pulse is inputted, a pulse rejection period is started (S11) and the counter 41 is incremented by one (S12). Then, the current pulse interval (time interval between the previous pulse and current pulse) is compared with the pulse interval six zones before. If the current pulse interval<the pulse interval six zones before, the internal timer 43 stops counting down time A+B (Step S33 in FIG. 14) and starts a countdown anew from the generation time of the current pulse (i.e., the timer is restarted). The pulse rejection period is set to the time B (i.e., setting example 1 is adopted) and the internal timer 43 continues counting down time B (S13, S15, S16, and S17).

On the other hand, if the current pulse interval≧the pulse interval six zones before, the end time of the pulse rejection period is set to the sum of the time A and time B from the end time of the previous pulse rejection period (i.e., setting example 2 is adopted) and the internal timer 43 continues counting down time A+B (Step S33 in FIG. 14) (i.e., the timer is not restarted) to the end (S13, S15, and S16).

Then, the time interval between the previous pulse and current pulse is saved in the pulse interval memory 70 (S20 and S21). Also, the following operations are performed, results are saved (S22 and S23), and control in mode 2 is continued.

Time A=(1−K)×pulse interval measured this time
Time B=K×pulse interval measured this time (3) Mode 3

Each time a motor driving pulse is inputted; a pulse rejection period is started (S11), the counter 41 is incremented by one (S12), and the internal timer 43 starts counting down the pulse rejection period (a fixed value) (S13 and S14) and control in mode 3 is continued until the motor 10 stops coasting.

FIG. 14 shows pulse compensation control for a missing pulse. The control in FIG. 14 is performed each time the pulse rejection period is ended. When the pulse rejection period is ended and a pulse acceptance period is started (S31), a countdown of time A+B, i.e., the sum of the time A and time B is started (S32 and S33) in the case of mode 2. If no motor driving pulse is obtained until the countdown of time A+B is finished, the pulse count of the counter 41 is incremented by one (S34 and S35). The pulse compensation control is not performed in modes 1 and 3.

According to the above embodiment, in forcibly incrementing the pulse count by one if a next pulse is not generated from the end point of a pulse rejection period to a predetermined time point in a pulse zone next to the pulse zone to which the pulse rejection period belongs, the "predetermined time" is defined as a time point when a predetermined time from the end point of the pulse rejection period, where the predetermined time is calculated as the sum $\{(1-K)*T_{n-7}+K*T_{n-6}\}$ of a time obtained by multiplying the pulse interval of the corresponding pulse zone (pulse zone n−7) one rotation before the pulse zone (pulse zone n−1 in FIG. 7) to which the pulse rejection period belongs by the coefficient 1−K and a time obtained by multiplying the pulse interval of the pulse zone (pulse zone n−6) next to the corresponding pulse zone one rotation before by the coefficient K, but this is not restrictive. For example, the "predetermined time" may be counted from the start point (the generation time of the pulse $P_{n-1}$) of the pulse rejection period and defined as the time $\{(2-K)*T_{n-7}\}$ obtained by multiplying the pulse interval of the corresponding pulse zone (pulse zone n−7) one rotation before the pulse zone to which the current pulse rejection period belongs by a coefficient 2−K(e.g., 2−K=1.2 if K=0.8).

Incidentally, although according to the above embodiment, the DC motor is a three-pole motor, the number of magnetic poles of the motor used in the present invention is not limited to this.

Also, although a reverse-shift-activated mirror angle control method and apparatus for a vehicle outer mirror which use the DC brush motor rotation amount detection method and apparatus according to the present invention have been described in the above embodiment, the DC brush motor rotation amount detection method and apparatus according to the present invention can be widely used in applications which involve counting pulses generated by switching of brushes when a DC brush motor rotates, removing any noise pulse generated during a pulse rejection period which is shorter than a pulse interval and which is started when the pulse is generated, counting pulses generated during pulse acceptance periods outside the pulse rejection periods, and thereby detecting a rotation amount of the DC brush motor. Specifically, as to in-vehicle applications, the DC brush motor rotation amount detection method and apparatus according to the present invention can be used to detect the rotation amounts of DC brush motors for power seats, sun roofs, power windows, etc. Also, they can be used to detect the rotation amounts of DC brush motors in applications other than in-vehicle applications.

What is claimed is:

1. A DC brush motor rotation amount detection method comprising the steps of: counting pulses generated by switching of brushes when a DC brush motor rotates; removing any noise pulse generated during a pulse rejection period which is shorter than a pulse interval and which is started when the pulse is generated; counting pulses generated during pulse acceptance periods outside the pulse rejection periods; and detecting a rotation amount of the DC brush motor, wherein the pulse rejection period during steady-state operation of the DC brush motor is ended when a predetermined time elapses from a start point of the pulse rejection period, where the predetermined time is calculated by multiplying a pulse interval of a corresponding pulse zone one rotation before a pulse zone to which the pulse rejection period belongs by a coefficient K(½<K<1).

2. The DC brush motor rotation amount detection method according to claim 1, wherein the pulse count is forcibly incremented by one if a next pulse is not generated from the end point of a pulse rejection period to a predetermined time point in a pulse zone next to the pulse zone to which the pulse rejection period belongs.

3. A DC brush motor rotation amount detection method comprising the steps of: counting pulses generated by switching of brushes when a DC brush motor rotates; removing any noise pulse generated during a pulse rejection period which is shorter than a pulse interval and which is started when the pulse is generated; counting pulses generated during pulse acceptance periods outside the pulse rejection periods; and detecting a rotation amount of the DC brush motor, wherein the pulse rejection period during steady-state operation of the DC brush motor is ended when a predetermined time elapses from an end point of a pulse rejection period in a pulse zone immediately preceding a pulse zone to which the current pulse rejection period belongs, where the predetermined time is calculated as the sum of a time obtained by multiplying a pulse interval of a corresponding pulse zone one rotation before the immediately preceding pulse zone by a coefficient 1−K(½<K<1) and a time obtained by multiplying a pulse interval of a corresponding pulse zone one rotation before a pulse zone to which the current pulse rejection period belongs by a coefficient K.

4. The DC brush motor rotation amount detection method according to claim 3, wherein the pulse count is forcibly incremented by one if a next pulse is not generated from the end point of a pulse rejection period to a predetermined time point in a pulse zone next to the pulse zone to which the pulse rejection period belongs.

5. A DC brush motor rotation amount detection method comprising the steps of: counting pulses generated by switching of brushes when a DC brush motor rotates; removing any noise pulse generated during a pulse rejection period which is shorter than a pulse interval and which is started when the pulse is generated; counting pulses generated during pulse acceptance periods outside the pulse rejection periods; and detecting a rotation amount of the DC brush motor, wherein:

by comparing a pulse interval of a pulse zone immediately preceding a pulse zone to which the current pulse rejection period belongs with a pulse interval of a corresponding pulse zone one rotation before the immediately preceding pulse zone during steady-state operation of the DC brush motor, if the pulse interval of the immediately preceding pulse zone is shorter than the pulse interval of a corresponding pulse zone one rotation before the immediately preceding pulse zone, the current pulse rejection period is ended when a predetermined time elapses from a start point of the current pulse rejection period, where the predetermined time is calculated by multiplying a pulse interval of a corresponding pulse zone one rotation before a pulse zone to which the current pulse rejection period belongs by a coefficient K(½<K<1), and if the pulse interval of the immediately preceding pulse zone is equal to or longer than the pulse interval of the corresponding pulse zone one rotation before the immediately, preceding pulse zone, the current pulse rejection period is ended when a predetermined time elapses from an end point of a pulse rejection period in the immediately preceding pulse zone, where the predetermined time is calculated as the sum of a time obtained by multiplying a pulse interval of a corresponding pulse zone one rotation before the immediately preceding pulse zone by a coefficient 1−K (½<K<1) and a time obtained by multiplying a pulse interval of a corresponding pulse zone one rotation before a pulse zone to which the current pulse rejection period belongs by a coefficient K.

6. The DC brush motor rotation amount detection method according to claim 5, wherein the pulse count is forcibly incremented by one if a next pulse is not generated from the end point of a pulse rejection period to a predetermined time point in a pulse zone next to the pulse zone to which the pulse rejection period belongs.

7. A DC brush motor rotation amount detection apparatus comprising:

pulse detecting means which detects pulses generated by switching of brushes when a DC brush motor rotates;

pulse rejection period setting means which sets a pulse rejection period in which acceptance of a next pulse is rejected for a predetermined period shorter than a pulse generation interval when the pulse detecting means detects a pulse;

a counter which counts pulses generated during pulse acceptance periods outside the pulse rejection periods and thereby detects a rotation amount of the DC brush motor;

pulse interval measuring means which measures time intervals between pulses generated in the pulse acceptance periods; and a pulse interval memory which stores the time intervals between pulses measured by the pulse interval measuring means, wherein the pulse rejection period setting means ends the pulse rejection period during steady-state operation of the DC brush motor when a predetermined time elapses from a start point of the pulse rejection period, where the predetermined time is calculated by multiplying a pulse interval of a corresponding pulse zone one rotation before a pulse zone to which the pulse rejection period belongs by a coefficient K(½<K<1), where the pulse interval is stored in the pulse interval memory.

8. The DC brush motor rotation amount detection apparatus according to claim 7, wherein the pulse rejection period setting means forcibly increments the pulse count by one if a next pulse is not generated from the end point of a pulse rejection period to a predetermined time point in a pulse zone next to the pulse zone to which the pulse rejection period belongs.

9. A DC brush motor rotation amount detection apparatus comprising:

pulse detecting means which detects pulses generated by switching of brushes when a DC brush motor rotates;

pulse rejection period setting means which sets a pulse rejection period in which acceptance of a next pulse is rejected for a predetermined period shorter than a pulse generation interval when the pulse detecting means detects a pulse;

a counter which counts pulses generated during pulse acceptance periods outside the pulse rejection periods and thereby detects a rotation amount of the DC brush motor;

pulse interval measuring means which measures time intervals between pulses generated in the pulse acceptance periods; and a pulse interval memory which stores the time intervals between pulses measured by the pulse interval measuring means, wherein the pulse rejection period setting means ends the pulse rejection period during steady-state operation of the DC brush motor when a predetermined time elapses from an end point of a pulse rejection period in a pulse zone immediately preceding a pulse zone to which the current pulse rejection period belongs, where the predetermined time is calculated as the sum of a time obtained by multiplying a pulse interval of a corresponding pulse zone one rotation before the immediately preceding pulse zone by a coefficient 1−K (½<K<1), where the pulse interval is stored in the pulse interval memory, and a time obtained by multiplying a pulse interval of a corresponding pulse zone one rotation before a pulse zone to which the current pulse rejection period belongs by a coefficient K, where the pulse interval is stored in the pulse interval memory.

10. The DC brush motor rotation amount detection apparatus according to claim 9, wherein the pulse rejection period setting means forcibly increments the pulse count by one if a next pulse is not generated from the end point of a pulse rejection period to a predetermined time point in a pulse zone next to the pulse zone to which the pulse rejection period belongs.

11. A DC brush motor rotation amount detection apparatus comprising:
   pulse detecting means which detects pulses generated by switching of brushes when a DC brush motor rotates;
   pulse rejection period setting means which sets a pulse rejection period in which acceptance of a next pulse is rejected for a predetermined period shorter than a pulse generation interval when the pulse detecting means detects a pulse;
   a counter which counts pulses generated during pulse acceptance periods outside the pulse rejection periods and thereby detects a rotation amount of the DC brush motor;
   pulse interval measuring means which measures time intervals between pulses generated in the pulse acceptance periods;
   a pulse interval memory which stores the time intervals between pulses measured by the pulse interval measuring means; and
   comparing means which compares a pulse interval of a pulse zone immediately preceding a pulse zone to which the current pulse rejection period belongs with a pulse interval of a corresponding pulse zone one rotation before the immediately preceding pulse zone, wherein during steady-state operation of the DC brush motor, if the pulse interval of the immediately preceding pulse zone is shorter than the pulse interval of a corresponding pulse zone one rotation before the immediately preceding pulse zone, the pulse rejection period setting means ends the current pulse rejection period when a predetermined time elapses from a start point of the current pulse rejection period, where the predetermined time is calculated by multiplying a pulse interval of a corresponding pulse zone one rotation before a pulse zone to which the current pulse rejection period belongs by a coefficient K(½<K<1), and if the pulse interval of the immediately preceding pulse zone is equal to or longer than the pulse interval of the corresponding pulse zone one rotation before the immediately preceding pulse zone, the pulse rejection period setting means ends the current pulse rejection period when a predetermined time elapses from an end point of a pulse rejection period in the immediately preceding pulse zone, where the predetermined time is calculated as the sum of a time obtained by multiplying a pulse interval of a corresponding pulse zone one rotation before the immediately preceding pulse zone by a coefficient 1−K(½<K<1) and a time obtained by multiplying a pulse interval of a corresponding pulse zone one rotation before a pulse zone to which the current pulse rejection period belongs by a coefficient K.

12. The DC brush motor rotation amount detection apparatus according to claim 11, wherein the pulse rejection period setting means forcibly increments the pulse count by one if a next pulse is not generated from the end point of a pulse rejection period to a predetermined time point in a pulse zone next to the pulse zone to which the pulse rejection period belongs.

* * * * *